(12) United States Patent
Mansell et al.

(10) Patent No.: US 11,141,649 B2
(45) Date of Patent: Oct. 12, 2021

(54) BINGO GAME APPLICATION PRODUCT AND SYSTEM RELATED THERETO

(71) Applicants: Walter Brian Mansell, Isanti, MN (US); Daniel Scott Dryden, Isanti, MN (US)

(72) Inventors: Walter Brian Mansell, Isanti, MN (US); Daniel Scott Dryden, Isanti, MN (US)

(*) Notice: Subject to any disclaimer, the term of this patent is extended or adjusted under 35 U.S.C. 154(b) by 0 days.

(21) Appl. No.: 16/843,930

(22) Filed: Apr. 9, 2020

(65) Prior Publication Data

US 2021/0154568 A1    May 27, 2021

Related U.S. Application Data

(60) Provisional application No. 62/939,133, filed on Nov. 22, 2019.

(51) Int. Cl.
*A63F 3/06* (2006.01)
*A63F 13/2145* (2014.01)
*A63F 13/213* (2014.01)
*A63F 13/65* (2014.01)

(52) U.S. Cl.
CPC ............ *A63F 3/0645* (2013.01); *A63F 3/064* (2013.01); *A63F 13/213* (2014.09); *A63F 13/2145* (2014.09); *A63F 13/65* (2014.09)

(58) Field of Classification Search
USPC .......................................................... 463/19
See application file for complete search history.

(56) References Cited

U.S. PATENT DOCUMENTS

| | | | | |
|---|---|---|---|---|
| 8,951,121 B2* | 2/2015 | Lyons | ................. | G07F 17/3204 463/37 |
| 2009/0118001 A1* | 5/2009 | Kelly | ................. | G07F 17/3286 463/29 |
| 2013/0137509 A1* | 5/2013 | Weber | ................. | G07F 17/3202 463/29 |
| 2014/0274344 A1* | 9/2014 | Kelly | ...................... | A63F 13/28 463/25 |
| 2017/0028295 A1* | 2/2017 | Patton | ..................... | G07F 17/32 |
| 2020/0222807 A1* | 7/2020 | Maggio | ................ | C07D 215/46 |
| 2021/0027577 A1* | 1/2021 | Thoeni | ..................... | A63F 13/70 |

\* cited by examiner

*Primary Examiner* — Pierre E Elisca
(74) *Attorney, Agent, or Firm* — Duren IP; Todd E. Zenger

(57) ABSTRACT

The disclosed technology is directed to methods, products and systems for streamlining the process of playing bingo. This patent is directed to a computer application whereby a computing device such as a mobile phone captures one or more likenesses of a bingo card(s) using the camera function of the device. Optical character or image recognition software and algorithms interpret and store the card(s) and corresponding characters. When characters are called for matching with the bingo cards in play, the called character is entered into the computing device. The application compares the called character to those captured by the computing device to identify instances of matches on each card in play until a winning card is identified and the player is alerted of the win, or until the game is over.

23 Claims, 44 Drawing Sheets

BINGO GAME APPLICATION PRODUCT AND SYSTEM RELATED THERETO

RELATED APPLICATION

This utility application claims priority to and is a continuation-in-part of previously filed U.S. provisional patent application Ser. No. 62/939,133 filed Nov. 22, 2019.

BACKGROUND OF THE INVENTION

Field of the Invention

The disclosed technology relates generally to products, methods and systems to assist bingo players. In particular, the technology is directed to a digital bingo game and assist application. In particular, the disclosed methods and system comprise generally integrating the capture of images of multiple bingo game cards by the App via interactive user/player input before and during the desired bingo game whereby the App monitors characters input by the player during play to identify winning play on multiple bingo cards simultaneously. More particularly, the invention relates to collecting and monitoring information on at least one bingo card and notify the player when the required, winning character sequence or pattern has been achieved on one or more of the bingo cards in play.

Background and Related Art

Bingo is a game of chance. One common form of bingo includes cards which are flat pieces of paper or cardboard containing 25 squares arranged in five vertical columns and five side to side rows (5×5). Each square in the grid contains a character such as a number, letter or other symbol, except the middle square which is often designated a "Free" space.

A common form of bingo includes using numbers 1 through 75. The five columns of the card are labeled 'B', 'I', 'N', 'G', and 'O' from left to right. For example, the range of printed numbers that can appear on the card is commonly assigned by column, with the 'B' column only containing numbers between 1 and 15 inclusive, the 'I' column containing only 16 through 30, 'N' containing 31 through 45, 'G' containing 46 through 60, and 'O' containing 61 through 75. While 5×5 is a common format, there are many potential square matrices depending on the desired variation in play such as 9×3 with 90 numbers for calling, and many others.

Often, prior to beginning bingo games, the venue administrator distributes to the bingo players a play programs listing the sequence of games to be played. The game starts with the game operator announcing the game type and the sequence/pattern on the game card which the player must have in order to win. The pattern must be produced by matches between the printed card symbols and the symbols drawn randomly by the game operator. The winning card or cards are those which first contain the predetermined pattern of matches announced by the game operator. For example, the required pattern may be a row, column, diagonal, complex pattern, or any other recognizable pattern including a totally matched card.

Typically, each player matches characters printed on cards with the characters called out by the game host. The called characters are randomly selected. The object of the game is to achieve characters corresponding to the required pattern on a card. Players compete against each other seeking to be the first to achieve the winning pattern. When a winner is identified a new game may be commenced.

Electronic bingo apparatuses and systems have been developed. For example, known versions of electronic bingo include a method and apparatus for consumer awards in published United States Application, Publication No. US 2013/0130785 (May 23, 2013), a networked multiple bingo game system in published United States Application, Publication No. US 2005/0208991 (Sep. 22, 2005) and an electronic bingo system in published United States Application, Publication No. US 2019/0151748 (May 23, 2019).

The known systems require some interaction with the bingo games server, network or other local device associated with the venue or the game in play.

SUMMARY OF THE INVENTION

The present invention comprises a computer-implemented application for streamlining the process of playing bingo that includes the steps of initiating a mobile application on a mobile device such as a smart phone, tablet, desktop computer or portable computer, augmented reality or virtual reality device, having a camera thereon, using the mobile device to capture at least one likeness of a bingo card, using optical character recognition software to interpret and store the card numbers or characters in association with the bingo cards on the mobile device, accessing at least one of the bingo cards for play, and inputting the called numbers or characters into the mobile device while in play to allow the mobile application to record and cross-reference the called numbers or characters with at least one bingo card currently in play, the mobile application immediately notifying the user when the bingo card has achieved bingo.

The disclosed and claimed methods, product and system are directed to a computer application (App) which assists a user/bingo player who wishes to participate in bingo games being hosted by another person or entity at some physical venue or other location and to do so independent of the electronic, network or system used by the venue to operate the game. The App controls a computing device to receive, process and transform a likeness of a physical bingo card including an array of squares including characters such as numbers, letters and/or symbols in the respective squares into a corresponding electronic, interactive display on a screen of a computing device.

The App applies optical image and character recognition technology to perform the receiving, processing and transforming functions. The App populates a database corresponding to each square and character in each square of the physical bingo card(s) in play into a corresponding electronic, interactive display. The App allows the player to select the required winning pattern of the game using an interactive display and to input the character called by the bingo game operator using an interactive display.

After each input, the App, without further input from the user/player compares the inputted, called character with each character in each square of the corresponding, electronic display. If the inputted, called character and a character in a square of the corresponding, electronic display are the same, the App, without further input from the player marks the corresponding square with an indication of an instance of a match.

After each input of a called character, the App continuously monitors each card in play to verify whether the cumulative instances of matches on a card in play has completed the required pattern to win. As soon as a winning pattern is verified on any card in play, the App communicates to the player that a winning pattern has been achieved on a card in play. The disclosed bingo gaming technology may be implemented as an application on a hand-held, mobile device such as a tablet, telephone or any other suitable computing device capable of running applications.

The above computer-implemented method for streamlining the process of playing bingo may also include the steps of adding and editing different game types, recording player data input from the App to a remote server once an internet connection can be established, providing GPS functionality to tag locations and to collect the location information of the specific bingo venue, including the type of bingo games that are played and variations in bingo rules that are played at the specific bingo venue, and using a content management system software application or set of related programs to create and manage the digital contents and to add and update content in the App.

The application may also use barcodes including but not limited to QR™ matrix barcode (or two-dimensional barcode), Universal Product Code (UPC), or other codes, or serial numbers or other identification numbers to recognize or identify bingo cards. The use of Bingo Cards containing technologies such as radiofrequency identification (RFID) and Near Field Communication located thereon or embedded therein to recognize or identify bingo cards may also be used, in accordance with the disclosure provided herein.

The App is not a gambling tool, method or system; it is a computer-implemented assist to aid bingo players. The App receives and transmits no bets or wagers and can be implemented entirely free of advertisements.

BRIEF DESCRIPTION OF THE DRAWINGS

In order that the manner in which the above referenced and other features and advantages of the disclosed methods and system are achieved, a more particular description will be rendered through reference to exemplary embodiments illustrated in the appended drawings. The drawing provide further understanding of the invention and constitute a part of this specification. It will be appreciated that the following descriptions and drawings depict only exemplary embodiments of the disclosed methods and systems and are not, therefore, to be considered as limiting in scope. Illustrative depictions include.

DETAILED DESCRIPTION OF THE INVENTION

Figure 1:
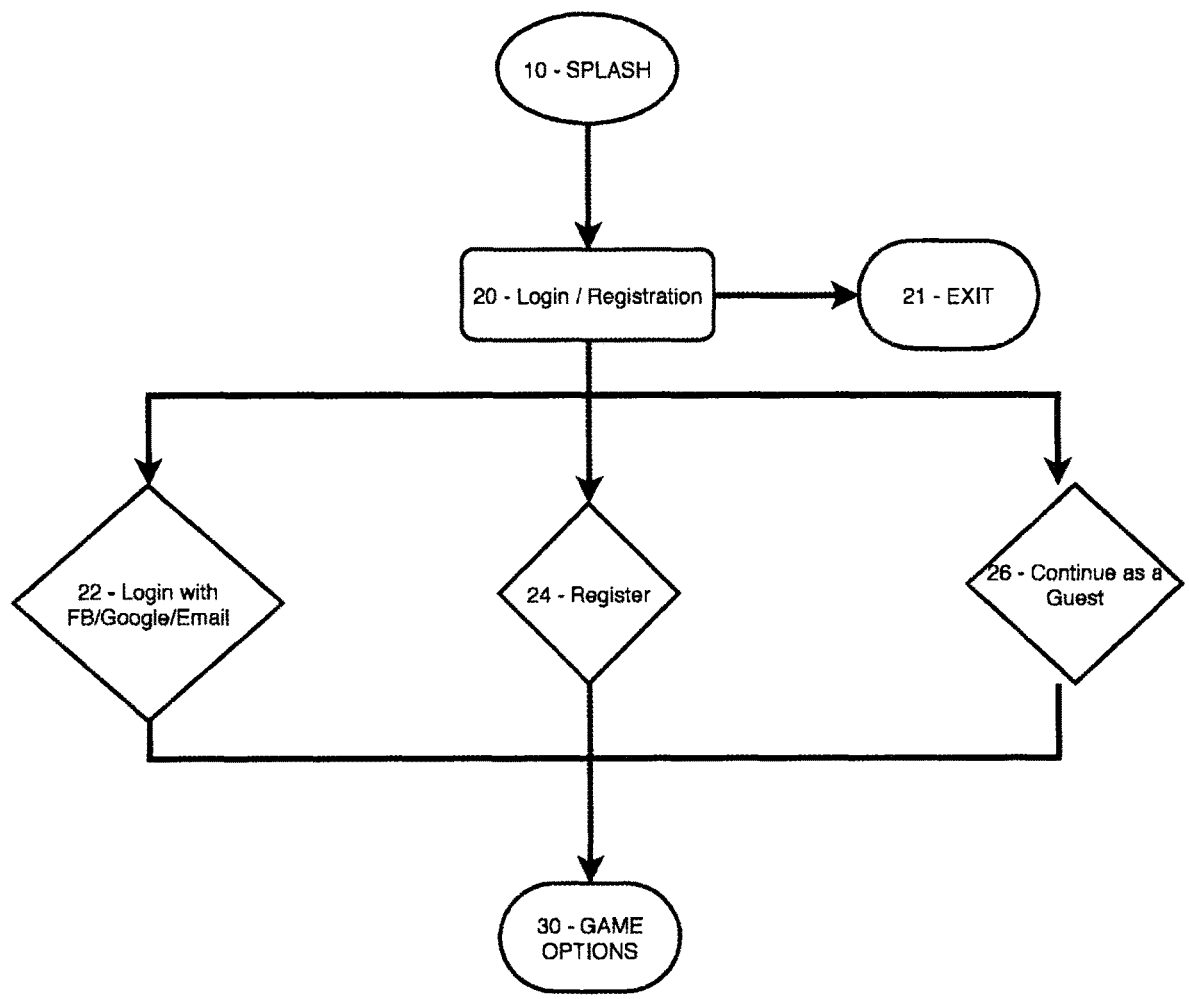
FIG. 1 is a flow chart depicting the initiation of the App for login and registration in accordance with the disclosed technology.

The general purpose of the present invention, which will be described subsequently in greater detail, is used to play bingo in a physical bingo hall location that uses static or physical paper cards. The App method, product and system and related device collects and monitors information on one or more static bingo card and notifies the player when one of the monitored static bingo cards becomes a winning card.

There has thus been outlined, rather broadly, the more important features of the invention in order that the detailed description thereof that follows may be better understood, and in order that the present contribution to the art may be better appreciated. There are additional features of the invention that will be described hereinafter, and which will form the subject matter of the claims appended hereto.

Bingo is a game of chance in which each player marks off numbers printed in different arrangements on normally 5×5 cards (5 squares horizontal and five squares vertical) as the numbers are drawn randomly by a caller, with the winner being the first person, or among the first persons, to mark off the required number or configuration of squares in the required winning pattern.

When a player finds the called numbers on a card in the winning pattern the plays calls out "Bingo!" to alert all participants to a winning card, which prompts the game caller (or an associate assisting the caller) to examine the card for verification of the win.

Players compete against one another to be the first, or among the first group, to have a winning arrangement for the prize or jackpot. After a winner is declared, the players clear, or discard, their bingo cards, and the game host begins a new round of play.

It is not uncommon for players to play multiple cards during each game. However, since Bingo can be a fast-paced game in which the numbers may be called at an evenly moderate to fast pace, often it can be difficult for some individuals to keep up with the monitoring of their cards especially when playing multiple cards, thereby leading to potential unmarked numbers on their cards and greatly reducing the player's chance of winning. Slight inattentiveness may also potentially result in unmarked numbers on a player's cards.

The present application is an attempt to solve the above mentioned problems by streamlining the process of playing bingo. More specifically, the present invention comprises a method, computer software and mobile application for optimizing a player's participation in the game of bingo by notifying the user when they have achieved bingo on one or more of their bingo cards. For example, in an embodiment of the mobile application (App) of the present invention the mobile application will preferably focus on 5×5 card bingo games, which are the most common among the application's target demographic.

The user in the mobile application will be able to select from more than one hundred pre-loaded game patterns upon launch and will have the ability to create, edit and delete new game patterns as necessary. The patterns added by the user will appear exclusively within the application that is installed on the user's device and not on devices used by other users even if the other users have the same mobile application.

The user will have the ability to name any new pattern-type the user creates. The user will also have an optional tool that allows the user to place a GPS tag on a location and store that location within the mobile application. The mobile application will remember what types of game patterns are played at a location and prompt the user to select one of those pattern types the next time he or she arrives at that location. In essence, the mobile application will learn patterns that will allow the mobile application to suggest pattern types to the user based on the user's location.

The present invention also includes the ability to transmit, record and store all of the above user information to a remote server or database and process such information for data mining purposes with the ability to process the aforementioned information in order to commercialize such information including but not limited to selling such information to potential advertisers, to assist in the advertising of services and products to the application user and to help enhance or improve features and quality of the application.

Another feature of the present invention is that the user can incorporate new bingo cards into the App. For example, the App user/player uses the camera function of the device to capture a likeness of the desired bingo cards to the device. The App then manages the use of optical character recognition (OCR) software to interpret and store the card numbers on the device. The App may also use barcodes including but not limited to QR™ matrix barcode (or two-dimensional barcode), Universal Product Code (UPC), or other codes, or serial numbers or other identification numbers to recognize or identify bingo cards. The use of Bingo Cards containing technologies such as radio frequency identification (RFID) and Near Field Communication located thereon or embedded therein to recognize or identify bingo cards may also be used.

The application and device allow the user to enter the numbers being called out during the bingo game and monitors those number's arrangements on every card that the player is playing and notifies the player when one or more of the monitored static bingo cards becomes a winning card. During game use the user will first start up the mobile application and record the desired playing card or cards for play by a camera on the mobile device to capture static/paper bingo cards and converts them, such as through optical character recognition (OCR) technology, to a digital format, i.e. the numbers and their specific arrangement on each card.

As bingo numbers are called, the bingo App can receive the called number in play. For example, in some implementations, the player may manually input the called number to the bingo App. In the alternative, the called number may be entered into the application via voice recognition software to convert an audible input of the number in play either from an announcer or from the user/player and converts the audible input into an electronic signal or electronic based number.

Once the input of the ball number is entered into the system the system will record and cross-reference the called numbers with the bingo card or cards currently in play and will immediately notify the user when one or more of the cards has a winning bingo pattern.

Another feature of the present invention is that the present application may utilize image recognition functionality to capture the image of every card purchased for each game of bingo.

The mobile application may also use GPS functionality to tag locations and to collect the location information for all sessions.

A further feature of the present invention is that the mobile application may also record data to a remote server once an internet connection can be established. For example, the App may include functionality to collect data that had been difficult or impossible to obtain previously, such as, data related to the location, day/night of the week, and the player, including but not limited to, time between calls; number of games per session; time, number, and duration of sessions; time, number, and duration of breaks; time between games; duration of games; duration of games per pattern; number of calls per pattern, frequency of pattern use; use of layouts of multiple cards (1×3, 2×3, 1×2, etc.); location of user; number of users active and total; and location and when a session is created.

The feature of the present invention may include animations utilized to excite the user, along with optional sound effects and vibrations. The present application may also be enhanced by a content management system (CMS) software application or set of related programs that are used to create and manage the digital content with the ability to add and update content in the mobile application. The present application can be used in bars, bingo halls, and other venues that host bingo sessions. Sessions will usually consist of several games, each requiring different conditions to achieve bingo. The App allows the user to organize the game patterns so that the user can play multiple games in a row while adhering to a particular bingo venue's announced game sequence. When one bingo game has been completed, the user will have the ability to reset the game so that they can capture fresh cards for the next game.

One Embodiment of a Bingo App

The disclosed technology comprises methods, products and systems for allowing a bingo player to participate in bingo games being hosted by another in a venue and to do so independent of the electronic, network or system used by the venue to operate the game.

In its most basic form, the application (App) of this patent uses optical or intelligent character recognition to identify the numbers on each card and it stores each square, in memory, as a set. The App distinguishes the state of each square among those that have been marked and those that have not been marked. When it identifies that a number has been marked on one card it compares that number to those stored in each set and identifies and uses augmented reality (AR) to virtually mark, or highlight, that number on every other card stored in memory. The App may use a translucent virtual mark, of a different color than the real mark, to display the unmarked number on every card to the player. The player can then easily mark the remaining numbers on the cards being played. As the player marks the remaining numbers the virtual mark is removed. The App does not require an internet connection to assist the player to perceive called numbers to daub bingo cards or to announce bingo. A description of an illustrative embodiment of an App consistent with this invention follows with reference to schematic flow charts and exemplary screen shots.

To begin, the disclosed App (or any other suitable software) is downloaded onto a computing device and system

Figure 14:
FIG. 14 is an exemplary screen shot of a display generated by the App when the App is initialized.
Figure 15:
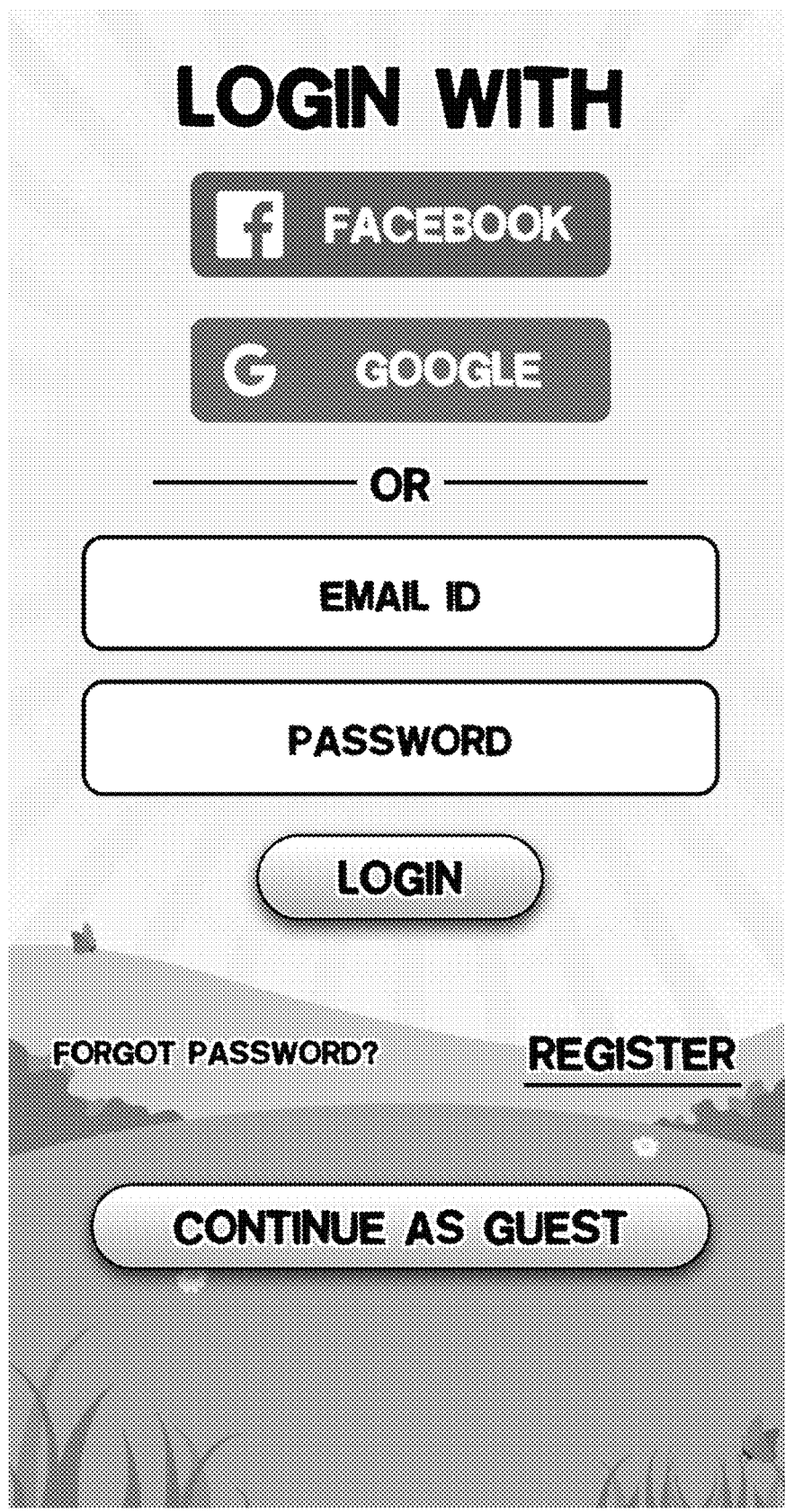
FIG. 15 is an exemplary screen shot of a display generated by the App when the START button in FIG. 14 is touched presenting qualifying logins are the option to continue as a guest.

1300, discussed below. Once the App is downloaded and installed on the computing device, the bingo player may initiate the App for the first time 10, FIG. 1 and FIG. 14. The first initiation or start-up may require the player to accept the App's User Agreement in order to access functionality. If by player input the player declines to accept the App's User Agreement the App exits initial start-up 21. If by player input, the player accepts the App's User Agreement, the App presents the player with a number of login/registration options such as login with Facebook, Google or email 22, player input registration 24 or continue as a guest 26, see FIG. 15.

Figure 2:
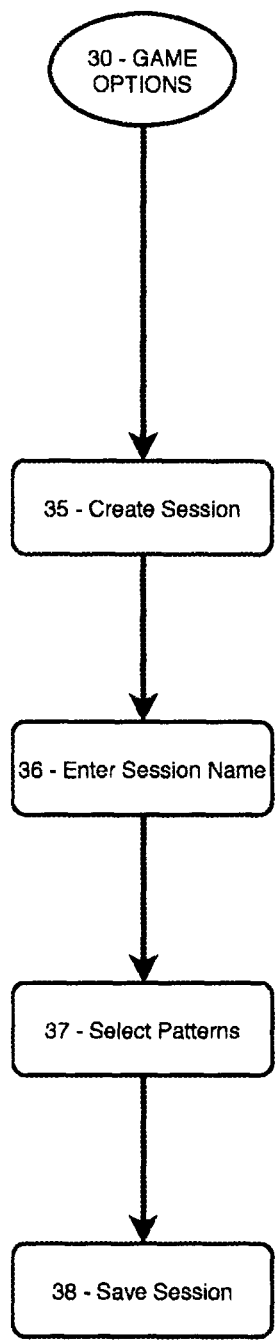
FIG. 2 is a flow chart depicting the input selections presented by the App to be made by interactive paid member/player input to create a session of bingo play in accordance with the disclosed technology.
Figure 16:
FIG. 16 is an exemplary screen shot of a display generated by the App after a qualifying login from FIG. 15 presenting game options to the player.
Figure 17:
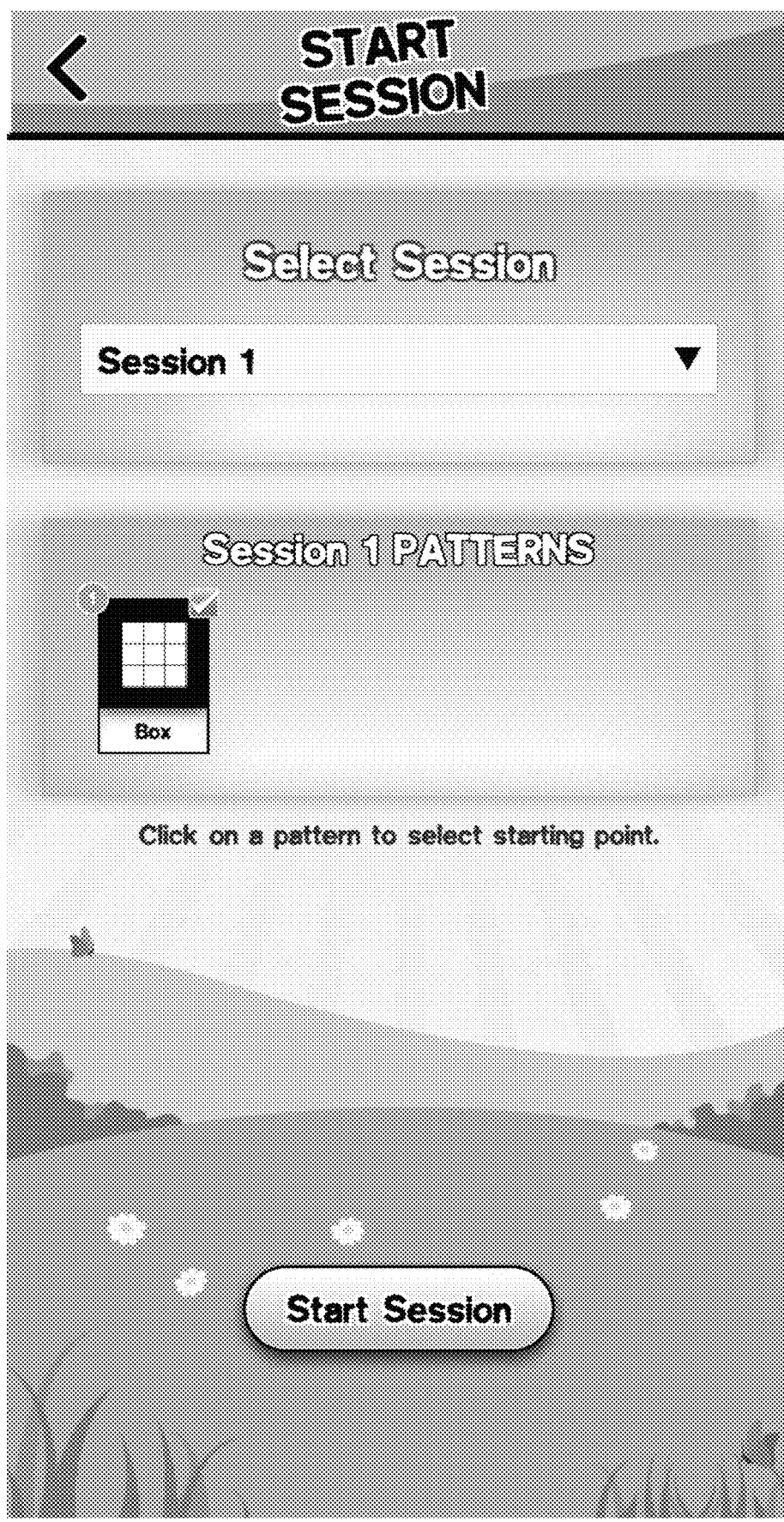
FIG. 17 is an exemplary screen shot of a display generated by the App when the SELECT A SESSION button in FIG. 16 is touched presenting a start session screen.
Figure 28:
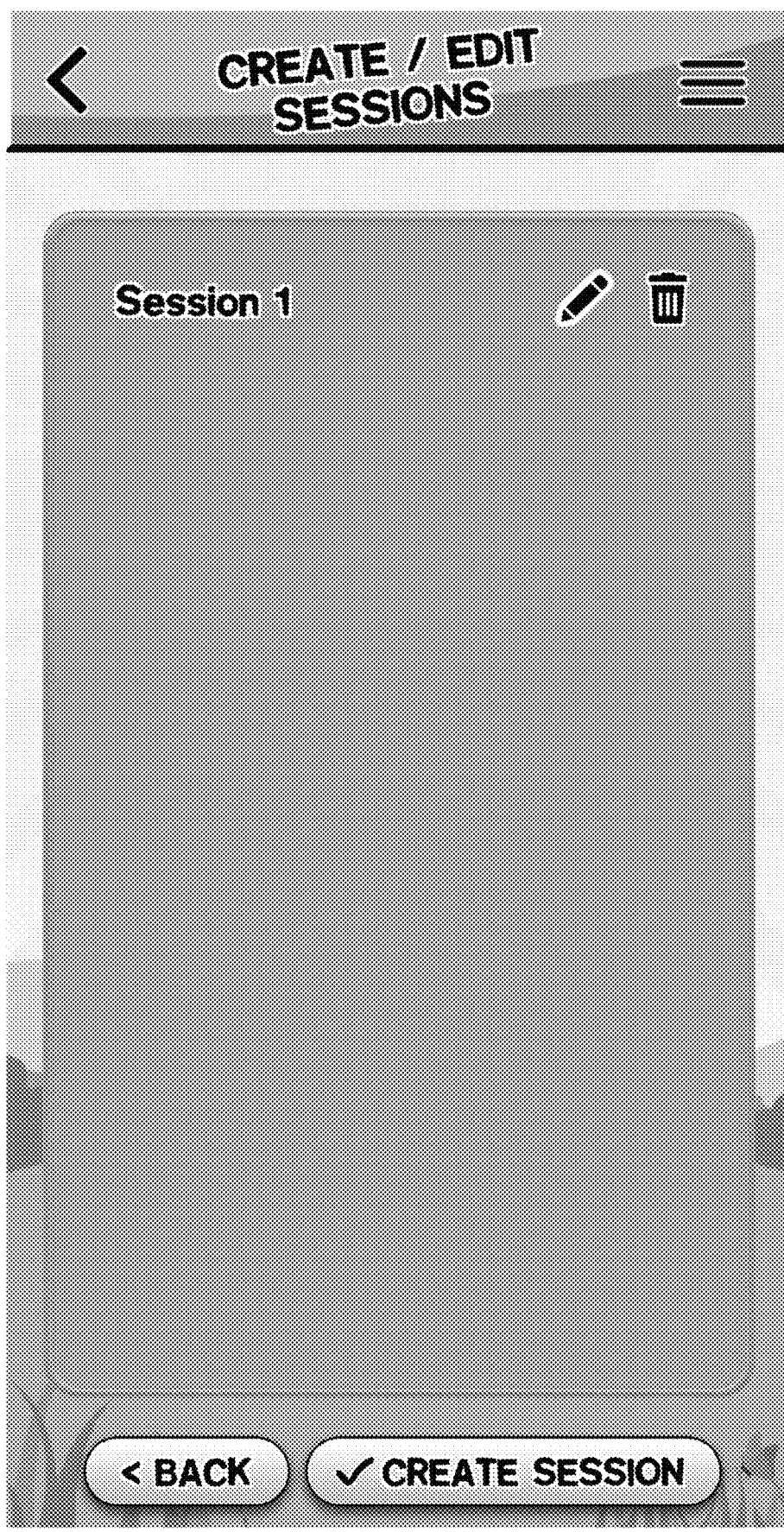
FIG. 28 is an exemplary screen shot of a display generated by the App when the CREATE/EDIT SESSIONS Button of FIG. 16 is touched presenting to the player previously saved sessions from which the player may select.
Figure 29:
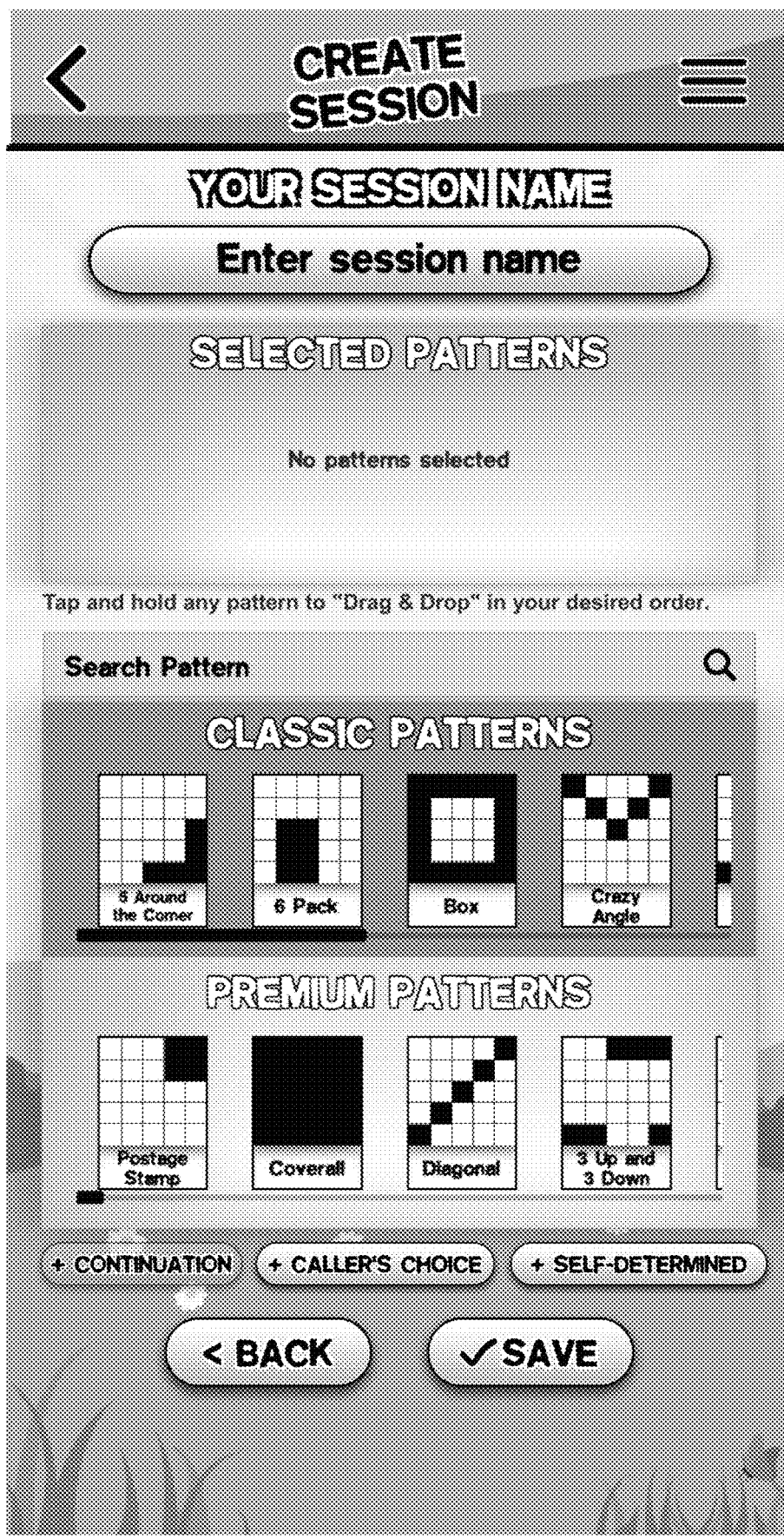
FIG. 29 is an exemplary screen shot of a display generated by the App when the CREATE SESSION button of FIG. 28 is touched presenting to the player input options as to session names and bingo game patterns.

Upon qualifying login, the App presents the player with game options, see FIG. 16 As depicted in FIGS. 2 and 16, the App may present the player with an interactive display allowing the player to select game options. For example, for qualifying members one game option may be creating a new session or editing a previously saved session 35 which includes naming the session 36, selecting the desired/required winning pattern(s) 37 and saving the session 38 to the computing device or system for subsequent game use. The functionality of creating/editing a session 35 is provided by the App. When by player input create/edit session 35 is selected by touching a button on display 1390, FIG. 16, the App displays create/edit options such as editing a previously stored session or creating a new session, FIG. 28. When the player selects create session (FIG. 28), the App displays options for creating a new session which may include naming the session 25, selecting the desired pattern for achieving bingo 27 and saving the session 38, see FIG. 29.

Figure 30:
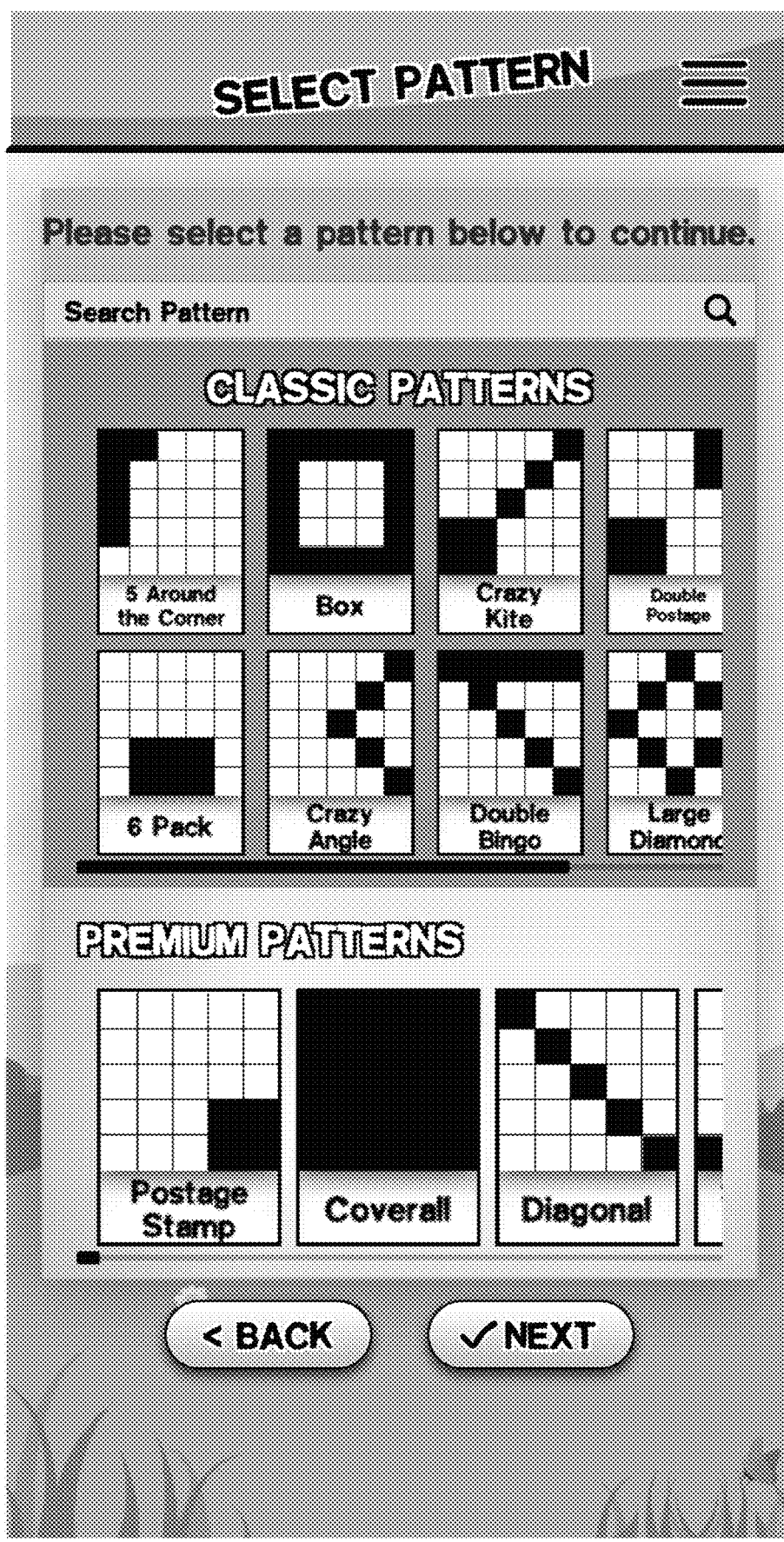
FIG. 30 is an exemplary screen shot of a display generated by the App when the PLAY A SINGLE GAME button of FIG. 16 is touched presenting to the player a selection of bingo game patterns.
Figure 31:
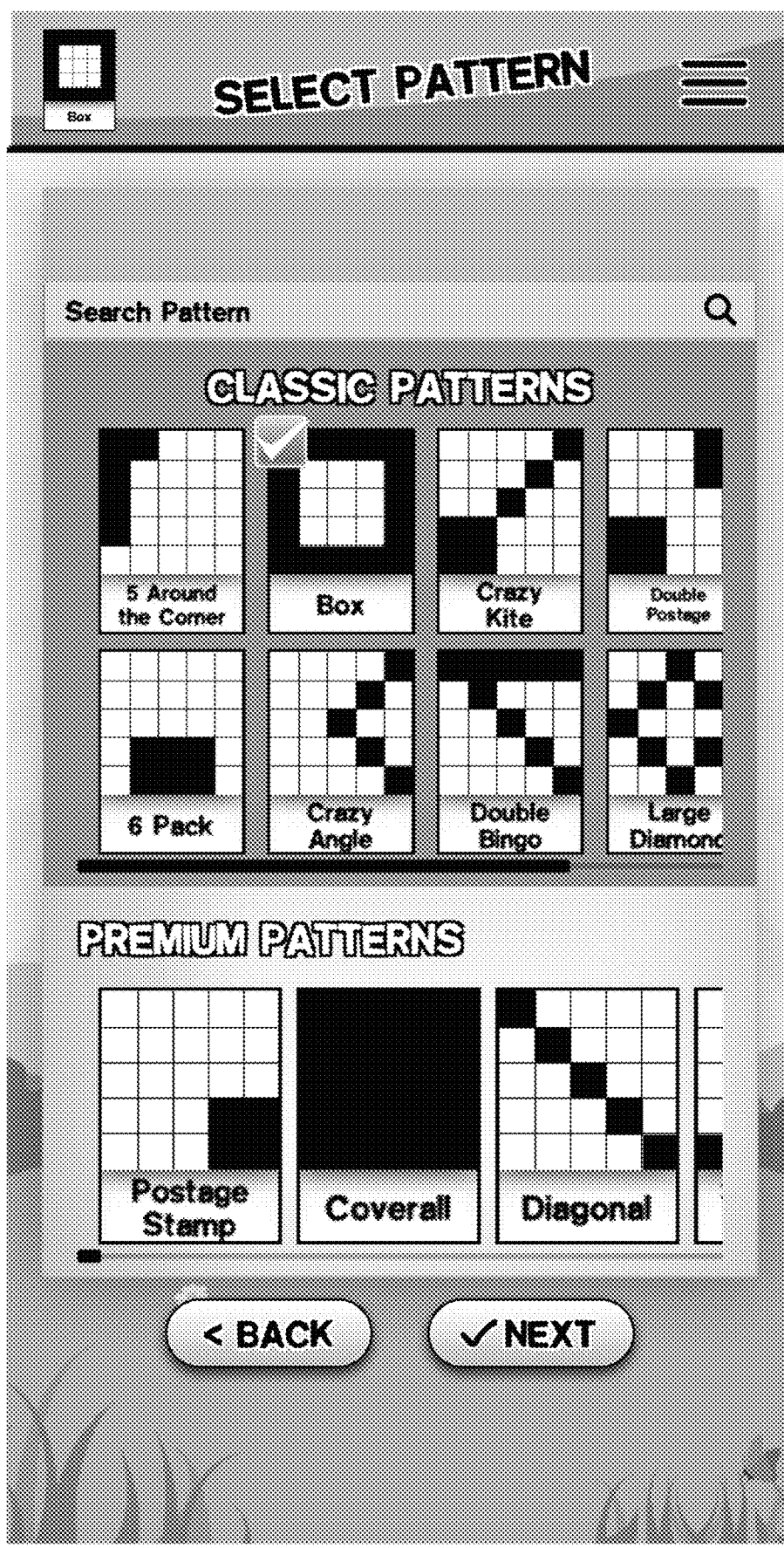
FIG. 31 is an exemplary screen shot of a display generated by the App when the player selected the Box pattern as shown in FIG. 30.

One embodiment of selecting a pattern 37 provided by the App includes an interactive display with choices of patterns displayed, see FIG. 30. For example, if the player wishes to select the Box pattern, the player touches display 1390 on the Box display. Upon doing so the App marks the Box patterns as selected with a check, see FIG. 31. Upon selecting NEXT on the Select Pattern screen (FIG. 31), the App returns the player to the next pre-bingo game option.

As depicted in FIGS. 3 and 16-21, in one embodiment the App may present the player with other pre-bingo or pre-game options 30 at an interactive display 1390 such as selecting a saved session 40, starting a session 50, capturing cards 60, displaying a game summary 70 and beginning session or game play 80.

The App presents the player with the option to select a session 40. When selected by player input, select a session 40 permits the player to select a previously saved session, for example from a drop-down menu, see FIG. 17. After selecting a session, the player may elect start session 50, FIG. 17. Upon starting a session, the App presents the player with the ability to capture likenesses of the physical bingo cards 60 the player has previously acquired for play, see FIG. 18.

Figure 3:
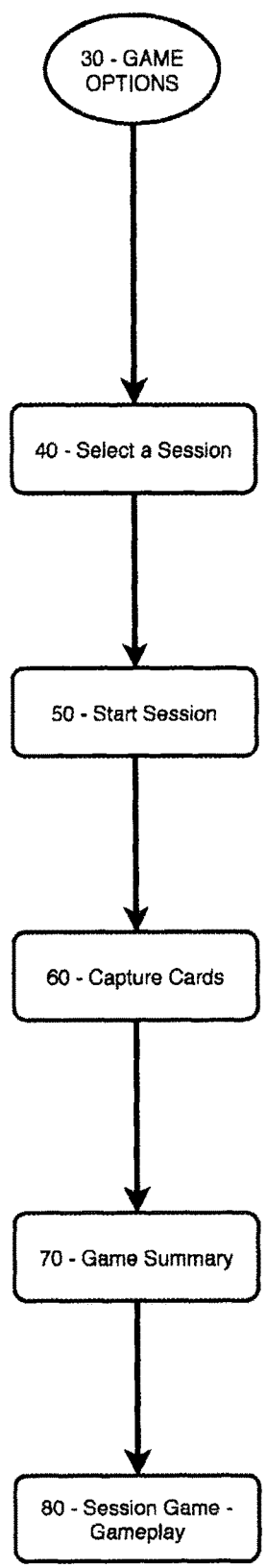
FIG. 3 is a flow chart depicting pre-game steps and selections presented by the App and to be made by interactive paid member/player input for a session game in accordance with the disclosed technology.
Figure 3A:
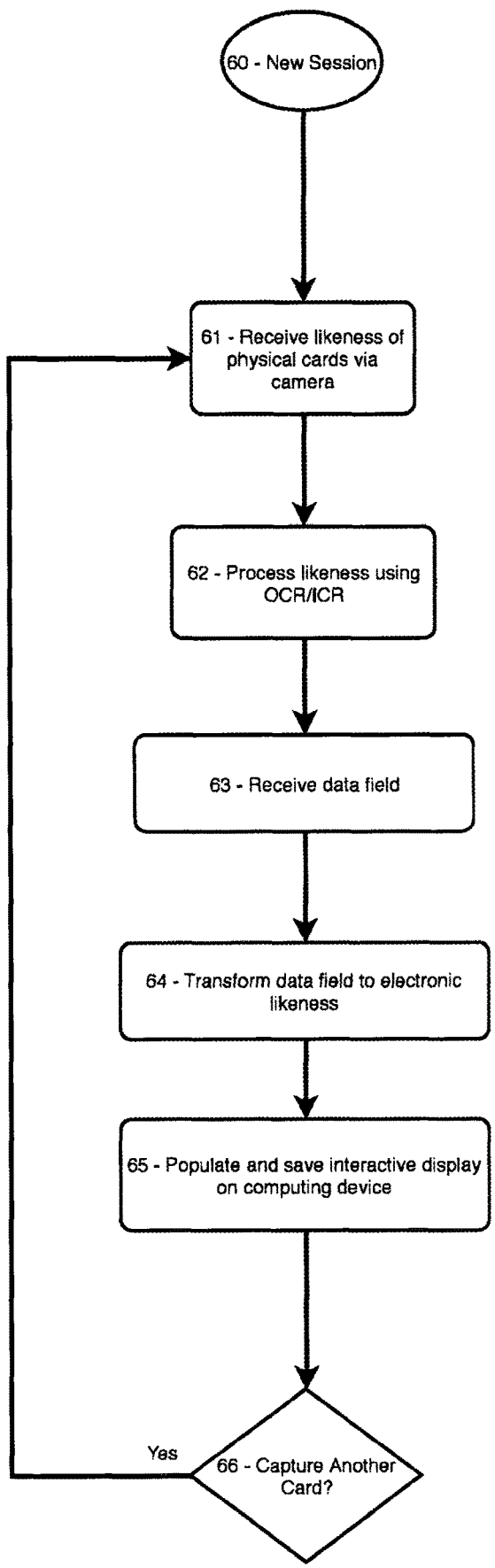
FIG. 3A depicts a means for capturing bingo cards.
Figure 18:
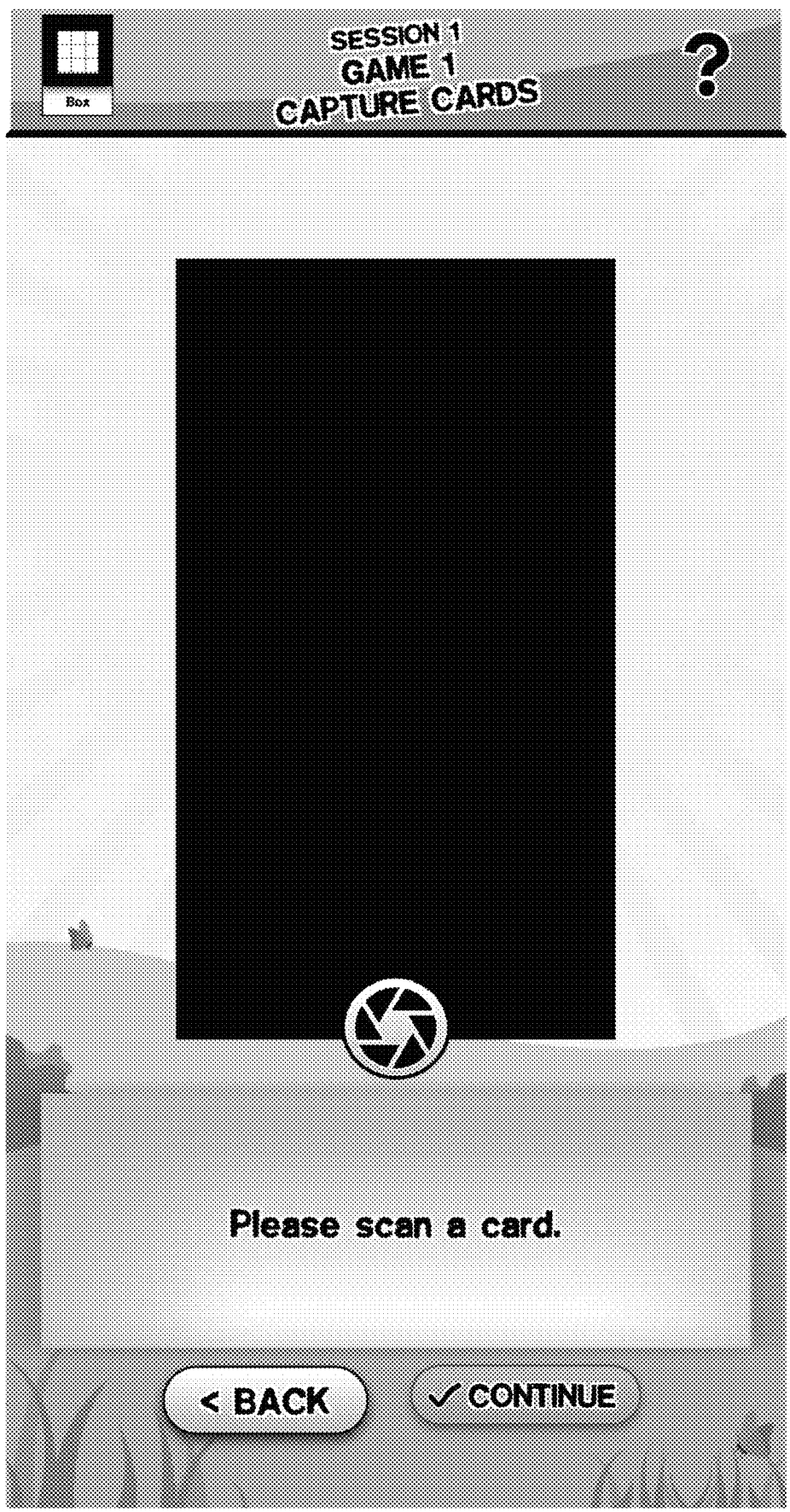
FIG. 18 is an exemplary screen shot of a display generated by the App when the START SESSION button in FIG. 17 is touched presenting the App's capture cards screen.
Figure 19:
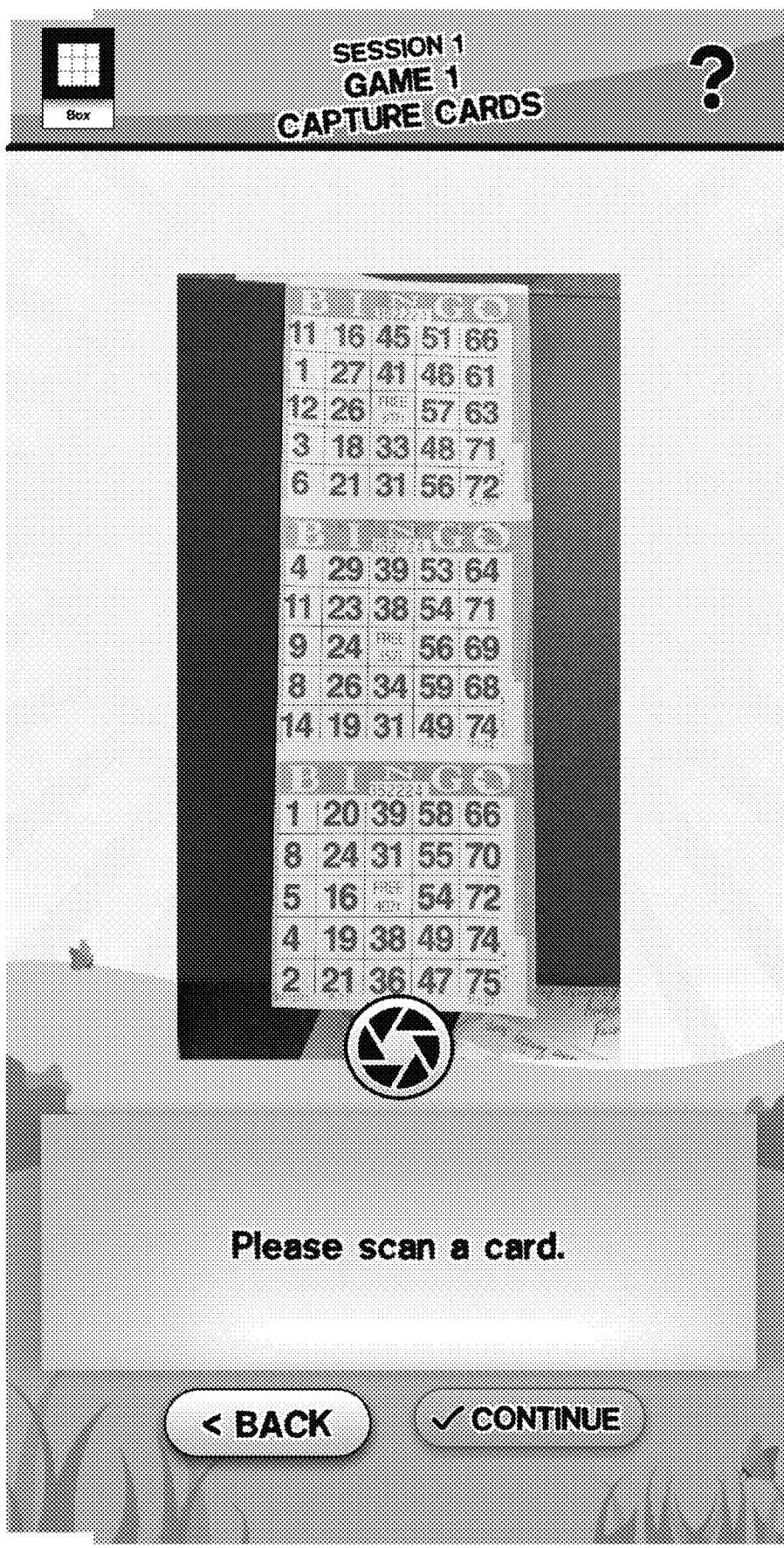
FIG. 19 is an exemplary screen shot of a display of FIG. 18 generated by the App when the camera function of the computing device is positioned above desired physical bingo cards.
Figure 20:
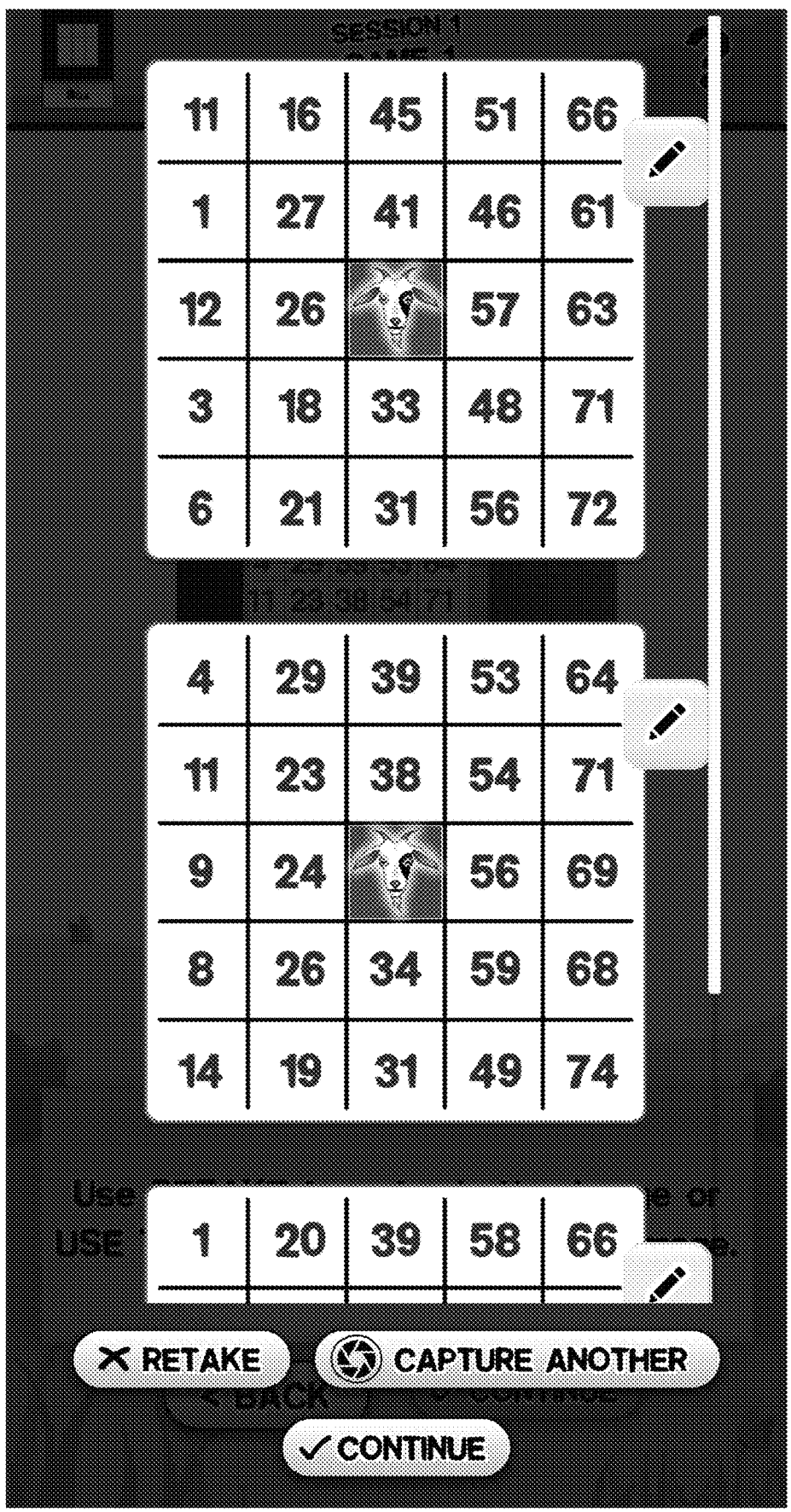
FIG. 20 is an exemplary screen shot of a display generated by the App of an electronic display generated and saved by the App corresponding to the physical bingo cards.

One means for capturing cards 60 may be accomplished by the steps illustrated in FIG. 3A via an interactive screen 1390, see FIG. 18. For example, the computing device 1300 includes a camera function 61 to receive or capture a likeness of the desired physical bingo card(s) 61 acquired by the user at the venue of the bingo game. Camera function 61 is activated during the capture cards 60 process. When initiated, the capture cards 60 steps of the App presents the player with an on-screen view through the camera, FIG. 18. As the camera lens is pointed at the desired physical bingo cards the cards come into view in the App, FIG. 19. The camera function of device 1300 is employed to receive a likeness of the physical bingo cards 61 into device 1300.

The App uses image/character recognition technology or feature detection technology such as Cuneiform or Tesseract, or other suitable optical recognition or detection technology to process the likenesses of the bingo cards 62. For example, optical recognition technology (OCR) processes the likeness 62 to identify graphic and/or character features of the desired bingo card. OCR is a method of converting a scanned image into machine-encoded text. When an image of the desired bingo card is received, OCR can be applied to store the likeness as a bit-mapped file in TIF format or in JPEG format. OCR then looks at each line of the images and attempts to determine if the lines represent a particular character or arrangement familiar to the OCR application to identify the presented character or graphic. This is known as pattern recognition or image correlation. OCR correlates the captured likeness with corresponding character and graphics familiar to the OCR application. The OCR application may also include neural networks.

In the alternative, the step of processing the likeness 62 may comprise feature extraction or intelligent character recognition (ICR). Instead of recognizing the complete pattern of the image like some OCR, ICR detects the individual component features (angled lines, crossed lines, etc.) from which the character or graphic is made. When a sufficient number of component features are detected, the detected features are compared by ICR to the known combinations of component features associated with character or graphics familiar to the ICR application to identify the presented character and/or graphic. Known OCR and ICR applications may also comprise the capability of reproducing formatted output that closely approximates the original likeness including images, columns, and other non-textual components.

The App uses an image processor such as Google Vision API to process the likeness 62. The image processor returns a data field 63 representing the image to device 1300. The App applies algorithms generated by those skilled in the art to mine the returned data field for the kind and placement of the bingo characters on the physical bingo cards for subsequent referencing by the App to subsequently find instances of match between called characters and the characters on the bingo cards. From the information provided in data field 63 the App saves the location and nature of each character in each square of each bingo card to the memory 1330 or mass storage 1345 of device 1300. Other algorithms are also applied to the returned data to transform the returned data into a display 64 on an output device 1390 such as a visual screen, preferably a user-interactive display screen, corresponding to the physical card(s) to populate the corresponding display 65 on screen 1390 to present the player with a digital, visual image of the physical card(s), see FIGS. 19-22. The App permits the player to edit the visual image if needed, FIG. 20

Figure 21:
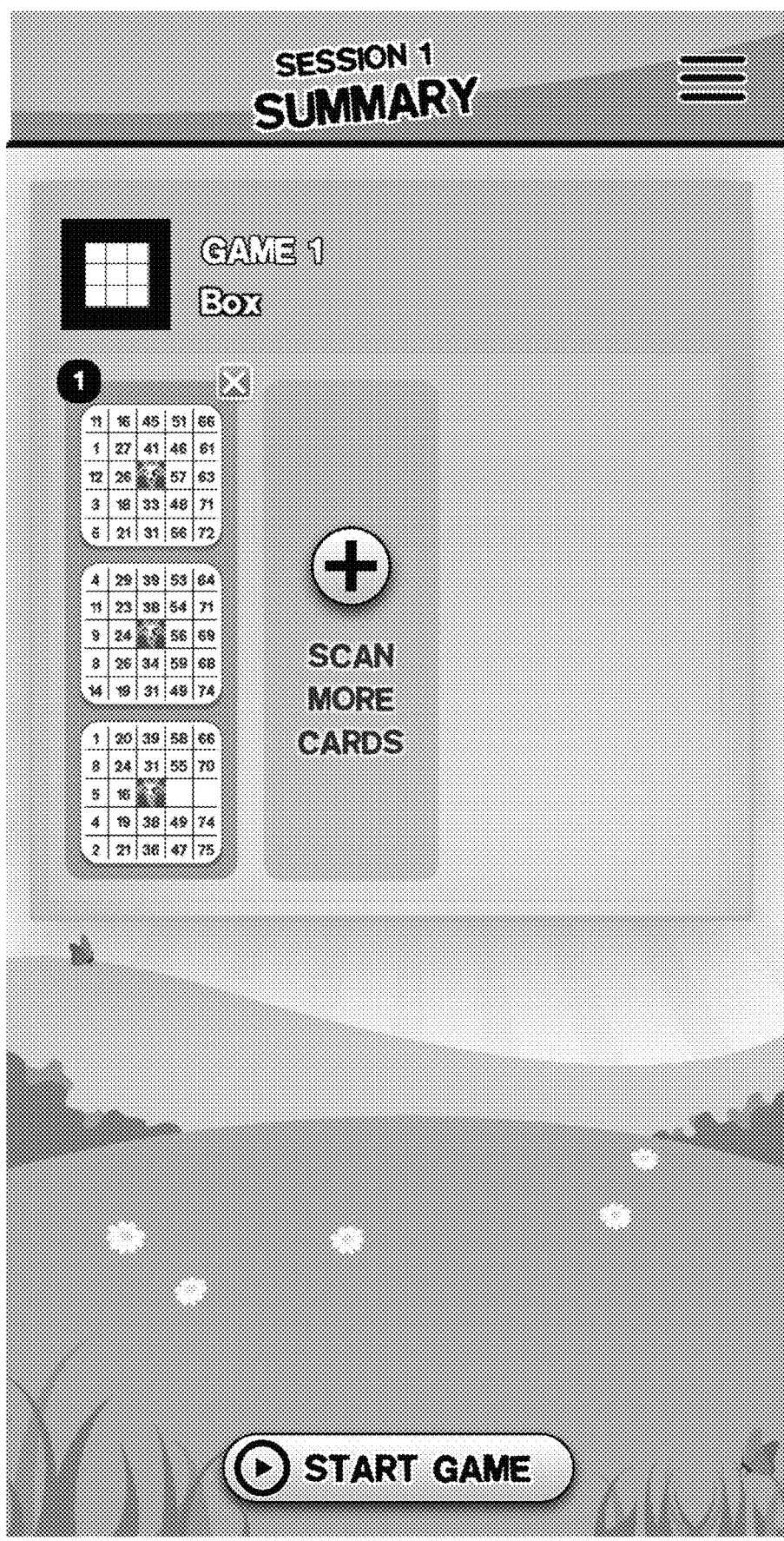
FIG. 21 is an exemplary screen shot of a display generated by the App when the CONTINUE button of FIG. 20 is touched presenting a session summary screen to the player.

The App presents the player with the option of capturing more cards 66, FIG. 21. If the player desires to receive another bingo card, the App returns to receiving step 61, FIG. 18. This receiving cycle is repeated as desired by the player to meet the player's desire and strategy as to how many cards the player wishes to have ready and/or to play either individually or simultaneously, as further discussed below.

When the player has captured all the intended bingo cards, the App presents a display of the game summary 70 on screen 1390 available for play, FIG. 21. The player may elect to start session game play 80, FIG. 21.

Figure 4:
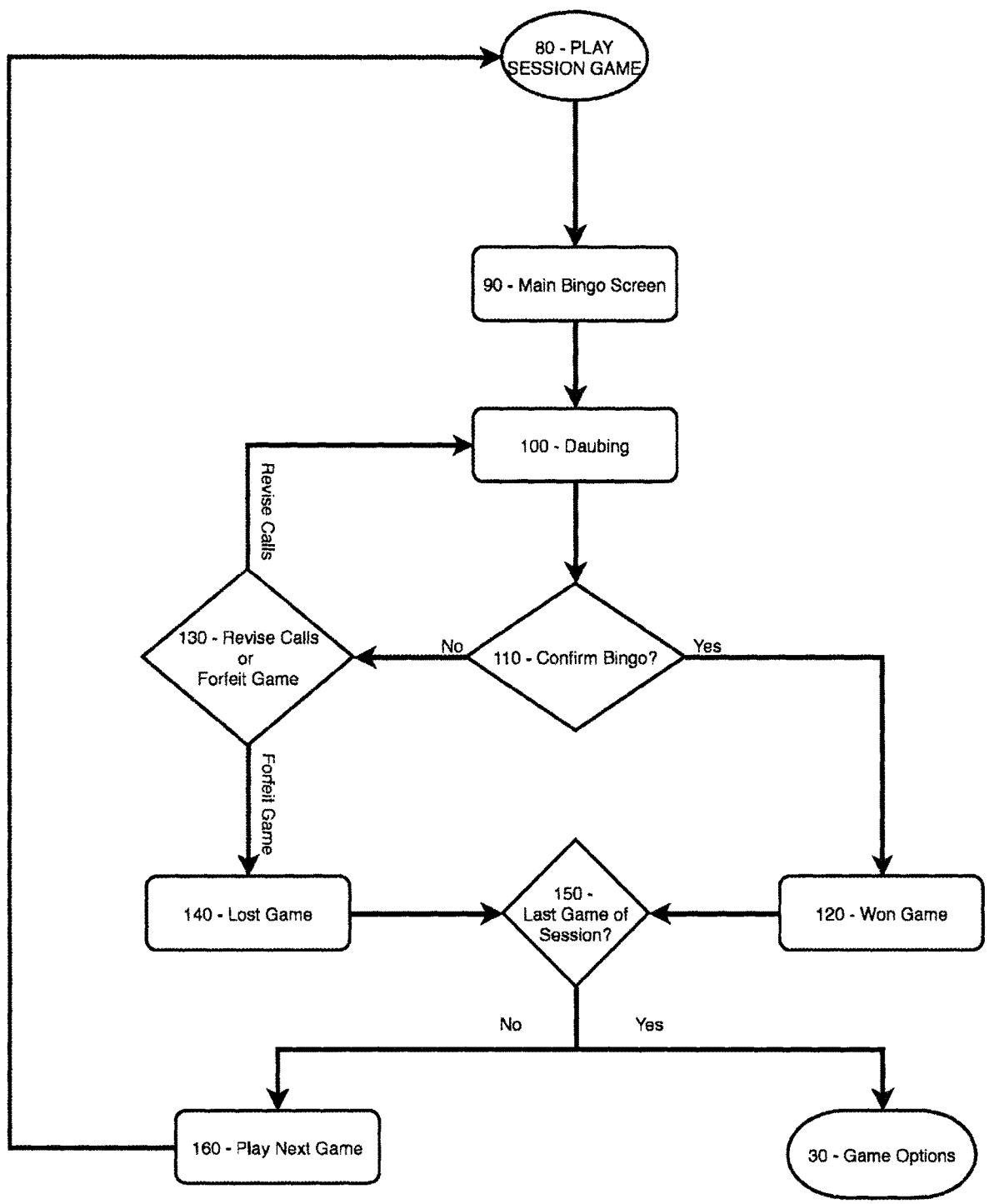
FIG. 4 is a flow chart depicting the assistive steps presented by the App during a bingo game consistent with FIG. 3 and with additional interactive input from the player in accordance with the disclosed technology.
Figure 22:
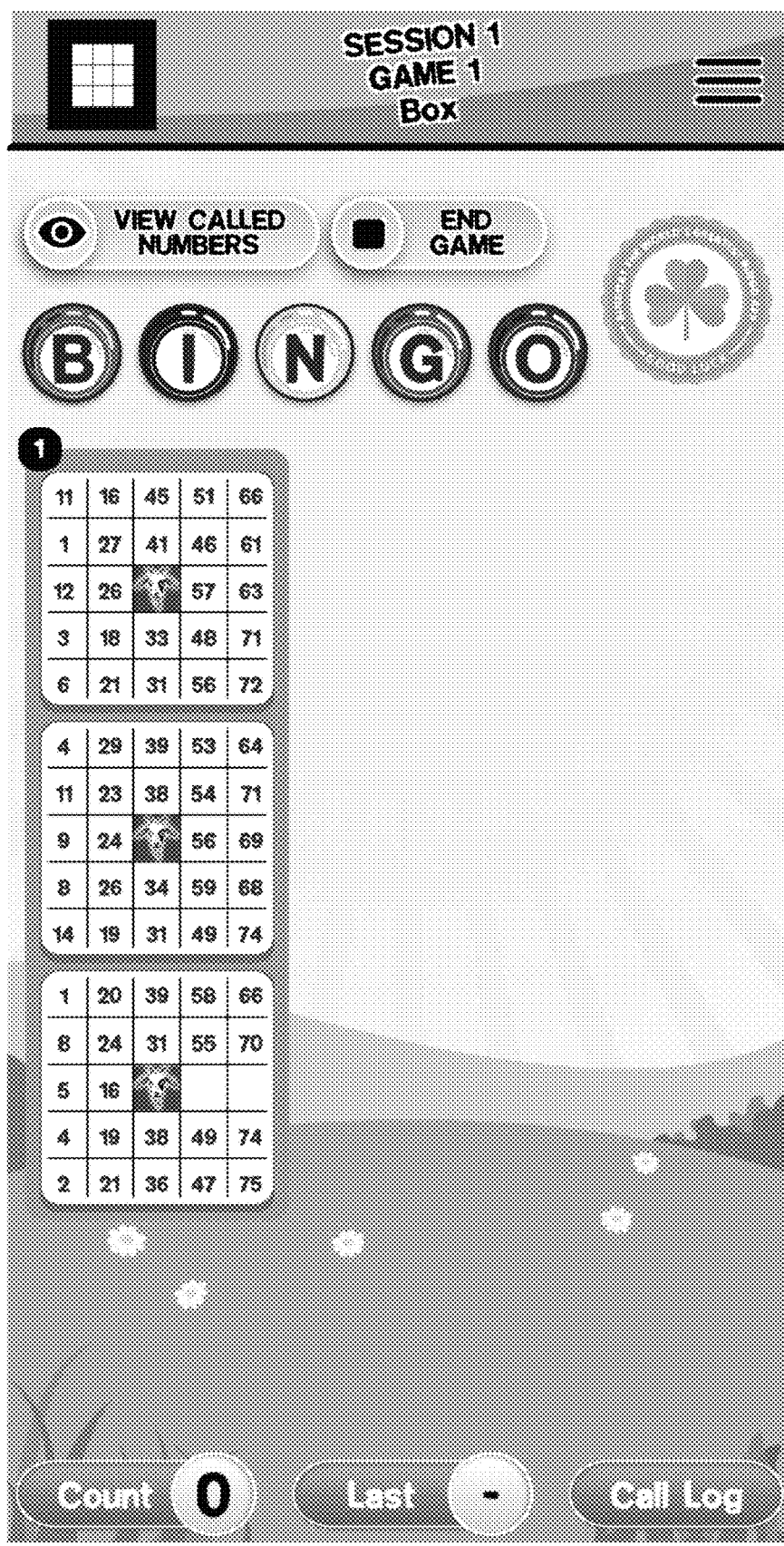
FIG. 22 is an exemplary screen shot of a display generated by the App when the START GAME button of FIG. 21 is touched presenting a session game screen to the player.

As depicted in FIG. 4, by player input on device 1300 selecting starting session play of the game 80, the App displays the main bingo screen 90 on output screen 1390, FIG. 22. Main bingo screen 90 presents a visual image of the captured cards, FIG. 22, and allows players to view their cards while games are in progress. As the game begins the game caller begins to call characters/numbers and daubing or marking begins. Daubing/marking is keeping track of the instances of when a called number matches a number on one or more cards in play. This is done by the App by making a visible mark or blot on the displayed card(s) in play for each instance of match.

Figure 5:
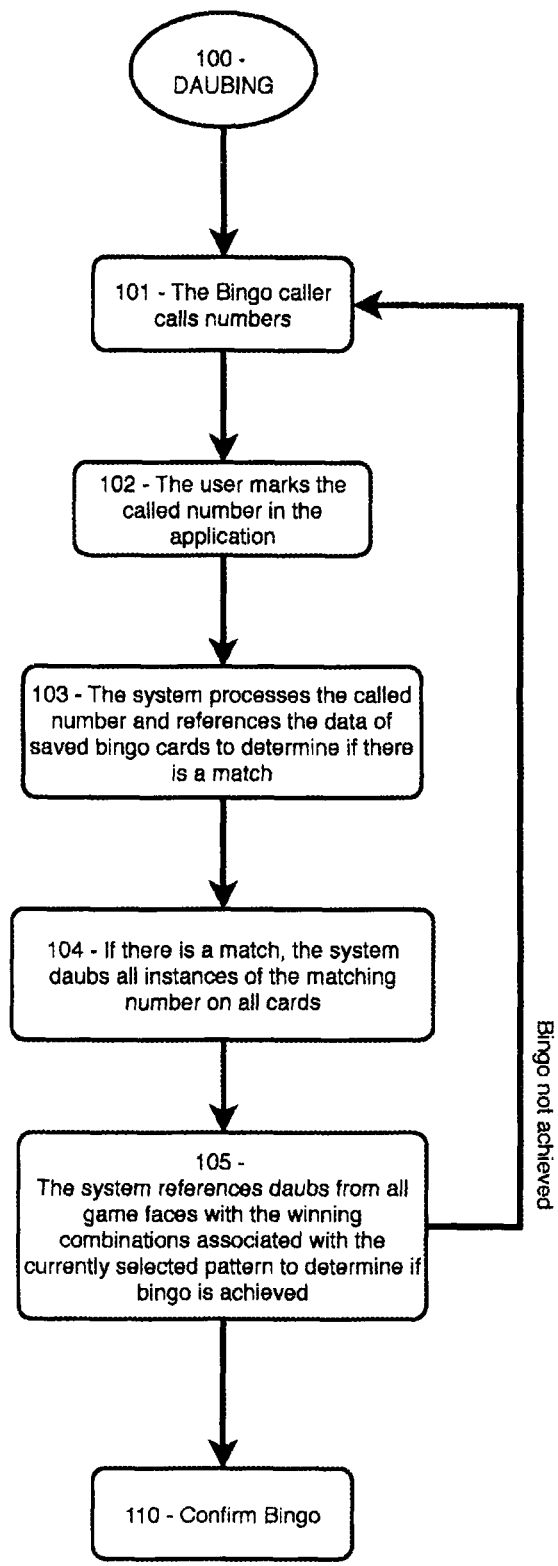
FIG. 5 is a flow chart depicting the assistive daubing operation 100 provided by the App corresponding to interactive input from the player in accordance with the disclosed technology.
Figure 23A:
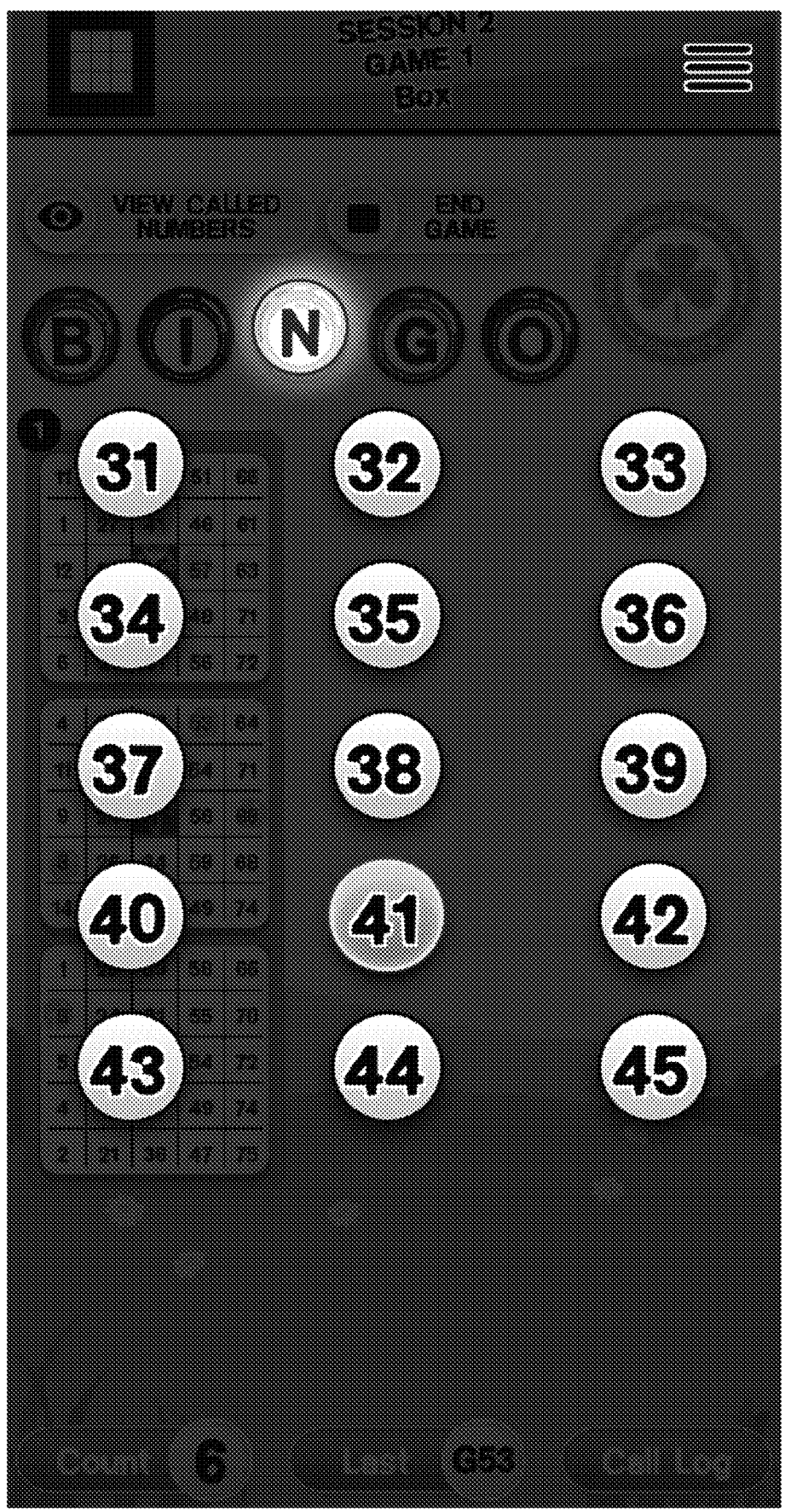
FIG. 23A is an exemplary screen shot of a display generated by the App when the player touches the letter B of FIG. 22 presenting to the player all B potential B number to be called in the game.

As depicted in FIG. 5, as the game caller calls a character 101 the App assists the player by electronically daubing the called character on each card(s) in play; this is accomplished by player input on device 1300 by the player marking or entering the called number into the App 102. For example, if the caller calls B14, the player touches the letter B depicted in FIG. 22 and the App automatically opens an input screen for all B numbers, FIG. 23A. Upon touching B14 the App automatically returns to main screen 90, FIG. 22 to await the next number call.

At main screen 90 the player may alternatively select an overlay of all potentially called numbers by selecting a view called numbers option, FIG. 22. The view called numbers overlay of the App presents the player with an overlay of all the possible numbers to be called. That is, the App presents a visual, interactive caller mode display with the letters B-I-N-G-O from left to right across the top with potential characters under each letter, FIG. 23B. In this example, the characters are numbers such that the numbers 1-15, 16-30, 31-45, 46-60 and 61-75 are under letters B, I, N, G, and O, respectively, FIG. 23B. As a number is called by the caller, by player input on interactive screen 1390, the player touches the corresponding, called number. The screen remains on the display awaiting the next called number.

Figure 22A:
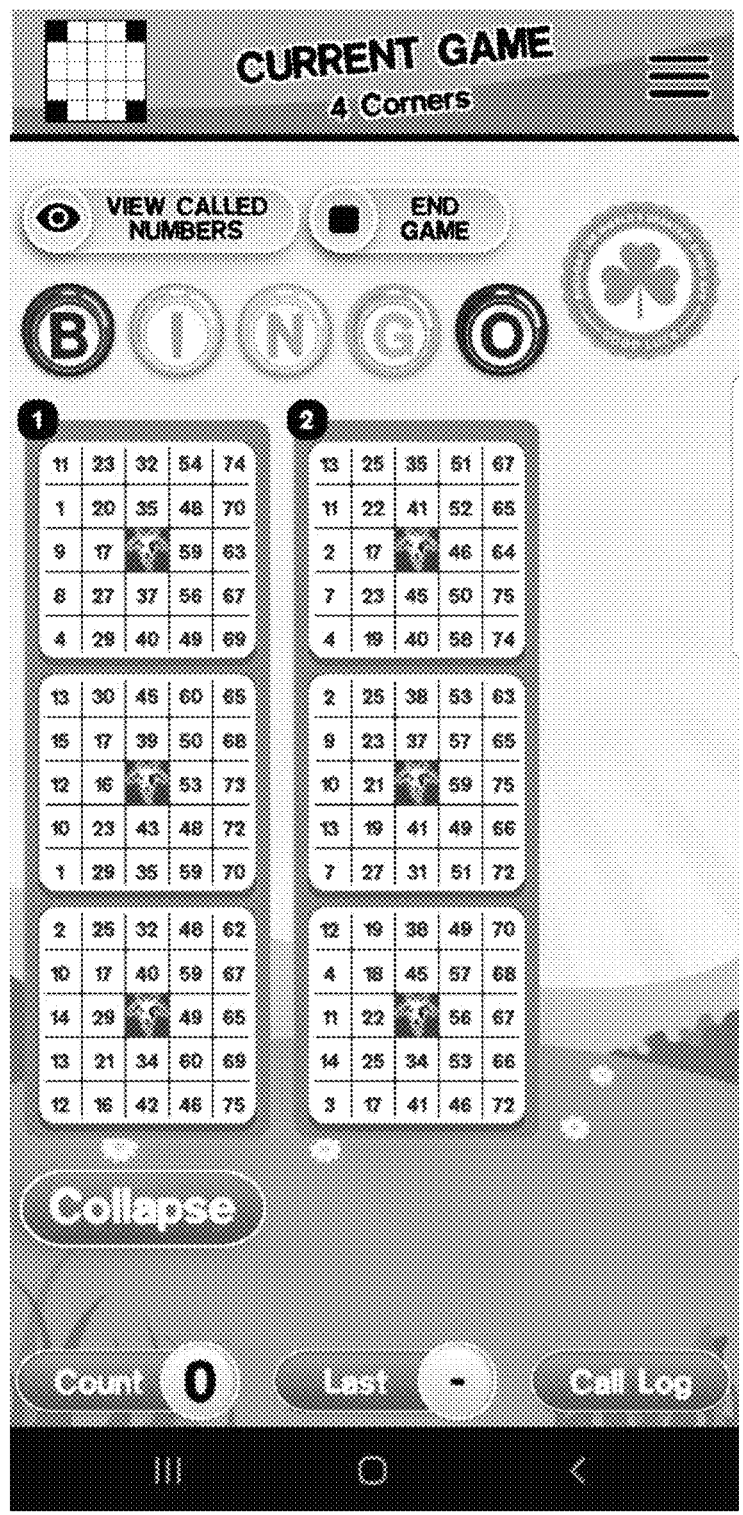
FIG. 22A is an exemplary screen shot of a display generated by the App illustrating a current game screen playing a four-square pattern in which a collapse feature is available to the player.
Figure 22B:
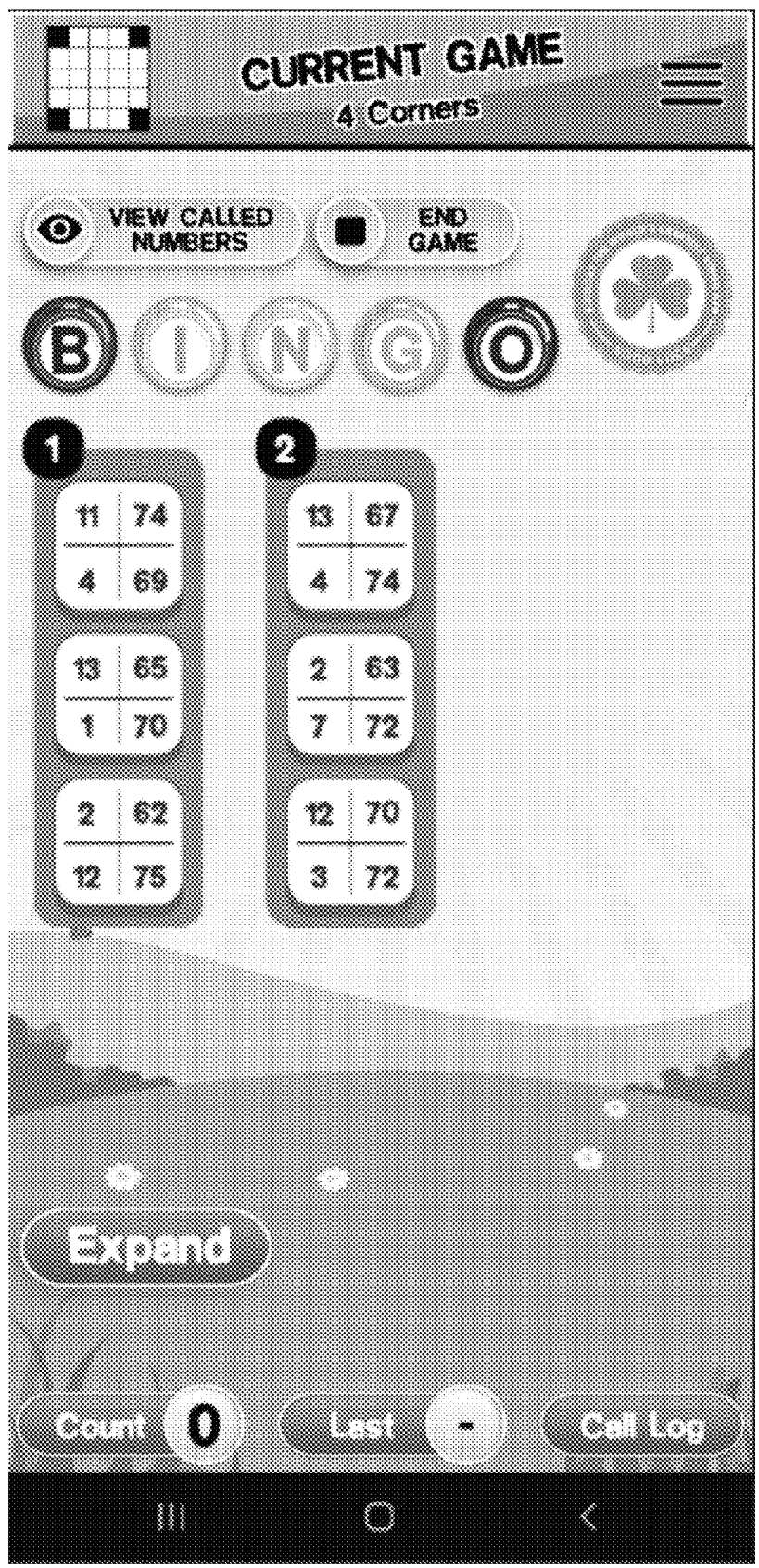
FIG. 22B is an exemplary screen shot of a display generated by the App when the collapse button in FIG. 22A is touched thereby collapsing the view of the bingo cards in a current game screen playing four square pattern to show just the four corner squares of each card needed to achieve bingo.

Other functionality provided by the App is collapsing the view of the cards in play to show only those squares required to achieve bingo. For example, if the chosen game pattern is four corners, that is, just the four squares in each corner of the bingo card must be matched to obtain bingo, the current game view may display all the squares on each card in play as shown in FIG. 22A. As shown in FIG. 22A, the App presents the player with a collapse view option button. When selected by player input (by touching an interactive screen 1390), the App changes the current game view of the cards in play to show just the four corner squares needed to achieve bingo, FIG. 22B. Collapsed view allows more game cards to be displayed on a single screen. When the collapsed game view of FIG. 22B is displayed, the previous collapse view button, FIG. 22A, is changed to an expand view button, FIG. 22B. When the expand view button is selected by player input, the current game view changes back to displaying all the squares of the game pattern on the card, FIG. 22A. The collapse-expand view functionality may be programmed into the App for given or selected game patterns which, when collapsed, allowed more bingo cards in play to be displayed on a single screen, for example, game patterns requiring only certain rows or columns of characters to be matched to achieve bingo.

Figure 25:
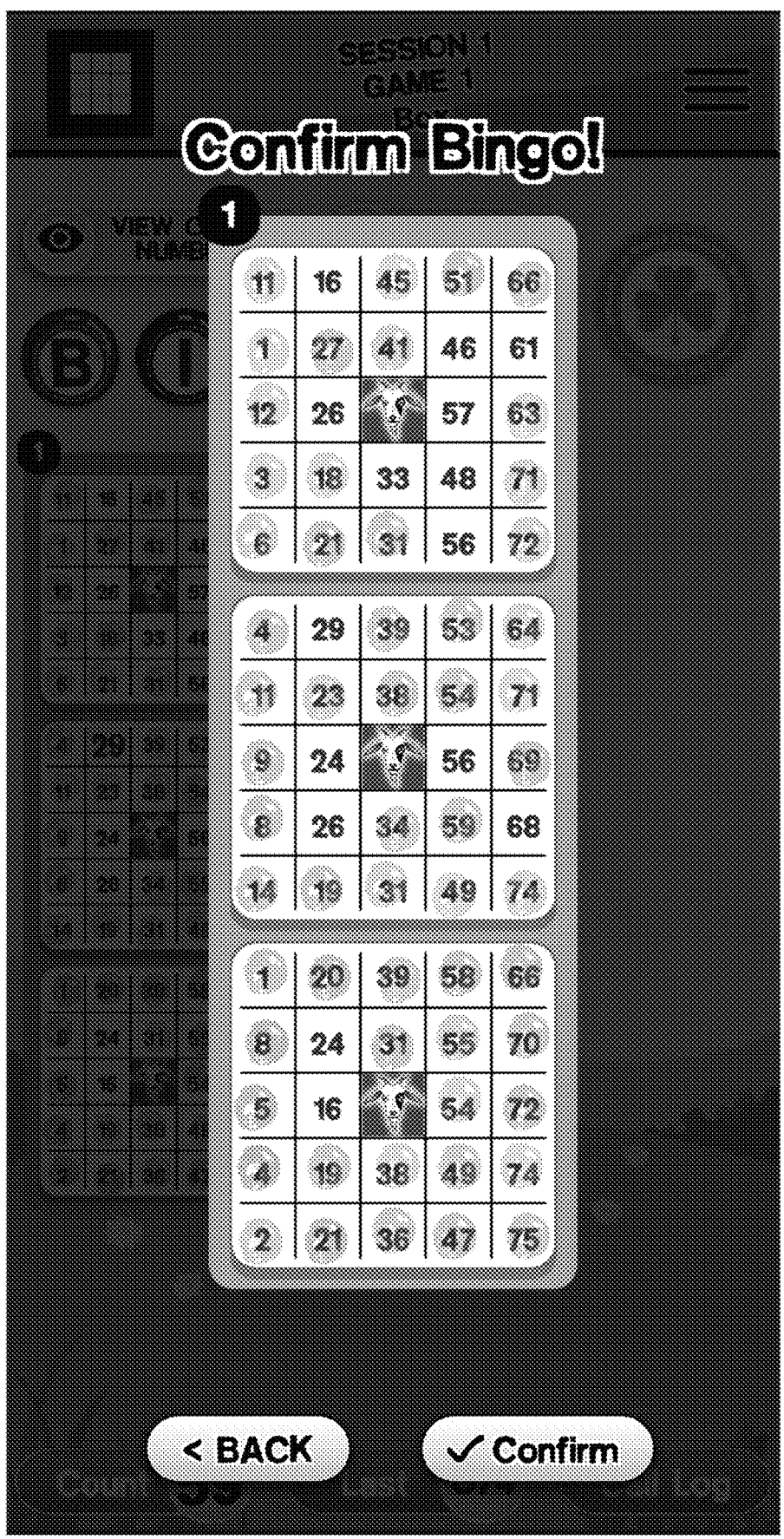
FIG. 25 is an exemplary screen shot of a display generated by the App and automatically presented to the player without further input from the player when bingo has been achieved on a card in play including a display of electronic daub marks on the called numbers.
Figure 26:
FIG. 26 is an exemplary screen shot of a display generated by the App when the CONFIRM button of FIG. 25 is touched presenting to the player a bingo celebration.

As called numbers are inputted by the player on device 1300, the App records the called character and then references or compares the inputted, called number to each number on each card in play to determine if there is an instance of a match 103, FIG. 5. If there is a match, the App electronically daubs all instances of the match on each displayed card in play 104 where a match is identified. The App references daubs from all game card faces with the required winning combination to determine if bingo has been achieved 105. If bingo has been achieved on at least one card, the App confirms bingo 110 to the player by displaying an alert of bingo on display 1390, FIG. 25. Once bingo is confirmed the App may display a bingo celebration graphic, FIG. 26.

If bingo 110 is not achieved on the last called character, by player input on device 1300 the App presents the player with the options to forfeit the game 130, enter revised calls (in the event the play missed a call or entered a character in error) 130 or enter the next called character. A game is forfeited when, for example, another player achieves bingo and the bingo game is lost by the player 140. Or, if the player achieves bingo then the player wins the game 120. After either losing the game 140 or winning the game 120, by player input on device 1300, the player may elect to discontinue play or play another game 150. If the player elects to play the next game 160, the App returns the display to begin session play 80. If the player elects to discontinue play, the App returns the player to the display for game options 30.

Figure 6:
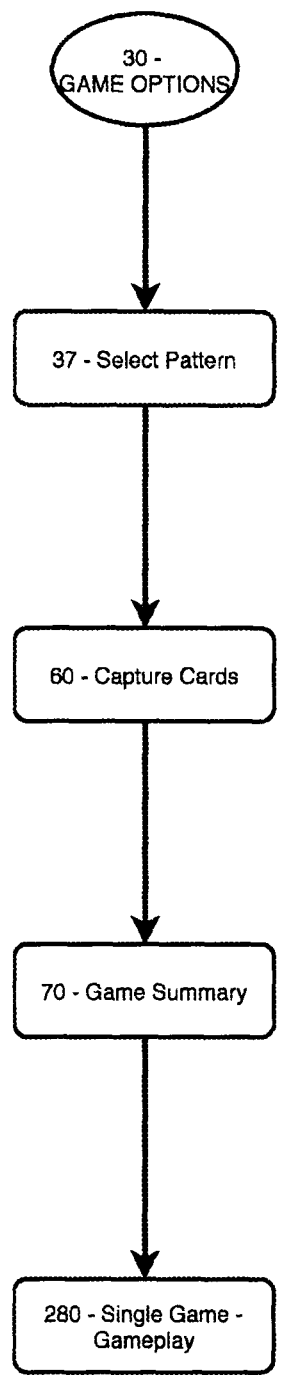
FIG. 6 is a flow chart depicting pre-game steps and selections of an alternative embodiment presented by the App and to be made by interactive paid member/player input for a single game in accordance with the disclosed technology.

As depicted in FIG. 6, another embodiment contemplates single game play. It begins at game options 30, see FIG. 16. When single game play is selected by player input, the App displays pattern selections 37 on an interactive display, FIG. 30. For example, if the player wishes to select the Box pattern, the player touches display 1390 on the Box display. Upon doing so the App marks the Box patterns as selected with a check, see FIG. 31.

Upon selecting NEXT on the Select Pattern screen (FIG. 31), the App returns the player to the next pre-bingo game option such as capture cards 60, FIG. 6.

As with other embodiments discussed herein, the App presents the player with the ability to capture images of bingo cards for play 60. After capturing cards, the App displays the game summary 70 and the player may select single game-gameplay 280.

Figure 7:
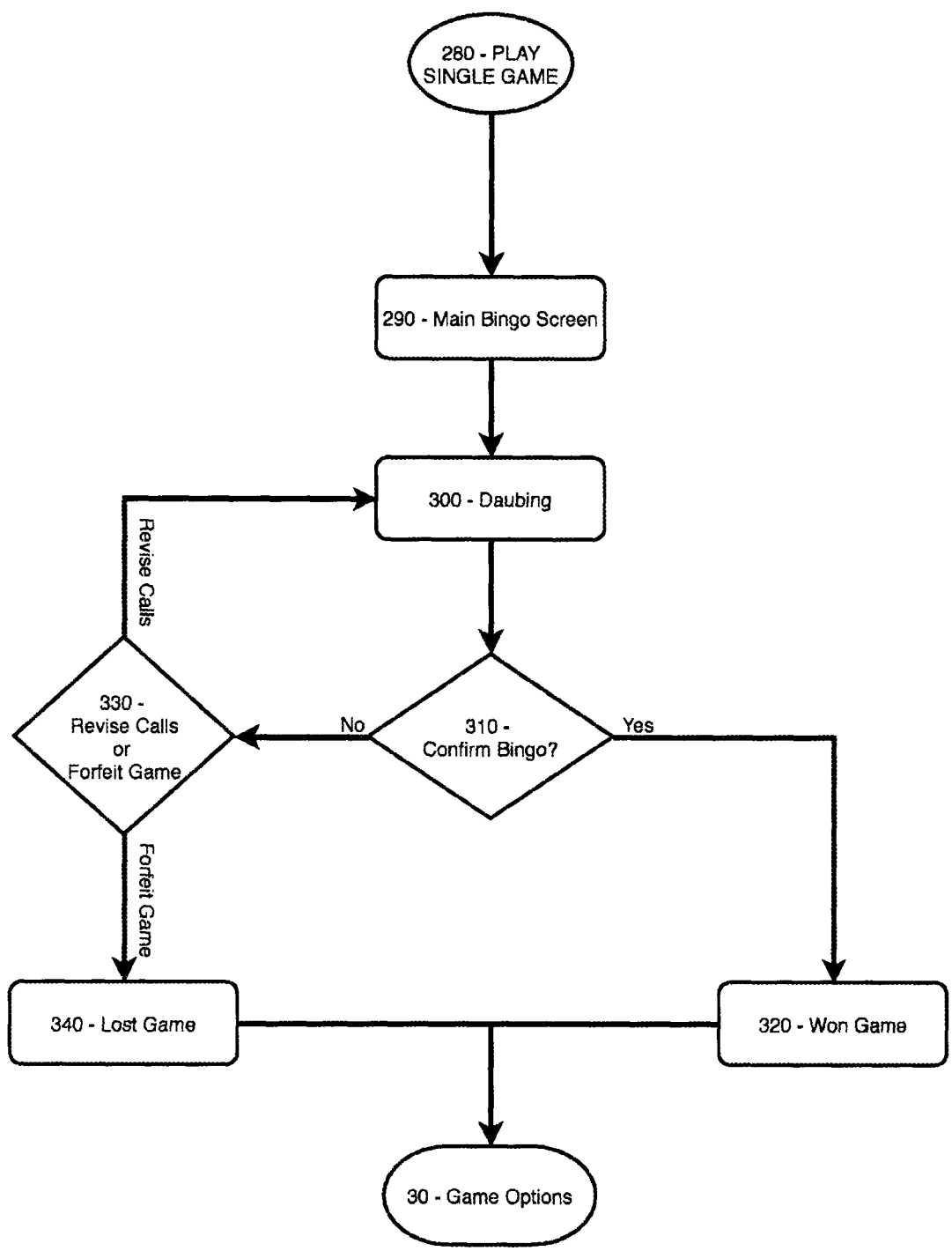
FIG. 7 is a flow chart depicting the assistive steps presented by the App during a bingo game consistent with the alternative embodiment of FIG. 6 and with additional interactive input from the player in accordance with the disclosed technology.

Upon player input selecting single game-gameplay 280, FIG. 7, the App initiates single play 280 by displaying the main bingo screen 290, see for example FIG. 21. As the game caller calls a character the App assists the player to electronically daub 300 the called character on each card(s) in play if the card includes the called character; this is accomplished by player input on device 1300. Daubing step 300 is like daubing 100 discussed above, see FIGS. 5, 22, 23A and 23B.

If bingo 310 is not achieved on the last called character, by player input on device 1300 the App presents the player with the options to forfeit the game 330, enter revised calls (in the event the play missed a call or entered a character in error) 330 or enter the next called character. A game is forfeited when, for example, another player achieves bingo and the bingo game is lost by the player 340. Or, if the player achieves bingo then the player wins the game 320. After either losing the game 340 or winning the game 320, the App returns the player to the display for game options 30.

Figure 8:
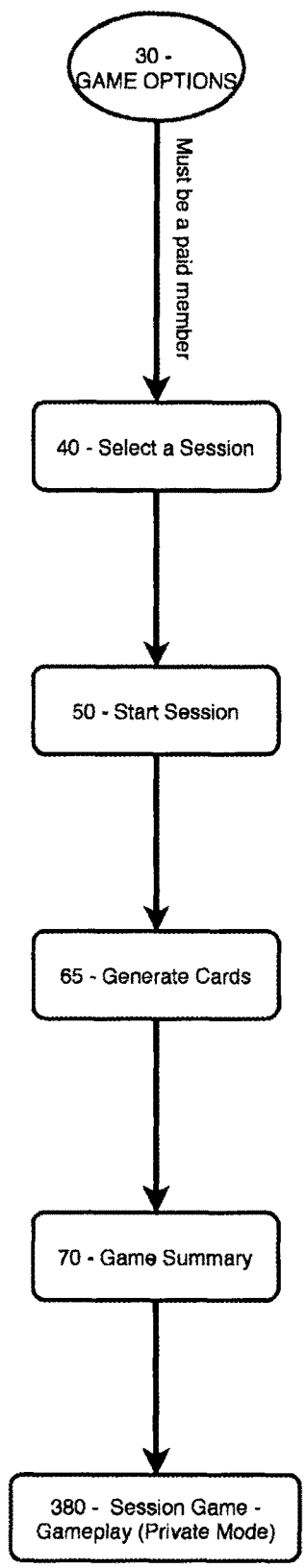
FIG. 8 is a flow chart depicting pre-game steps and selections of an alternative embodiment presented by the App and to be made by interactive paid member/player input for a session game in accordance with the disclosed technology.
Figure 32:
FIG. 32 is an exemplary screen shot of a display generated by the App when the PRIVATE MODE button of FIG. 16 is touched presenting to the player private mode game options.

Another embodiment comprises a private mode session game as a game option, FIGS. 8 and 32. In private mode the player may play bingo alone, or with others. As depicted in FIG. 8, in private mode, the App may present the player with pre-bingo or pre-game options 30 at an interactive display 1390 such as selecting a saved session 40 and starting it session 50, generating cards 65, displaying a game summary 70 and beginning session or game play 380.

In private play, the App also provides options to create/edit sessions or play a single game, FIG. 32. Creating or editing a session and playing a single game is accomplished as discussed above in connection with FIGS. 2 and 6.

Figure 9:
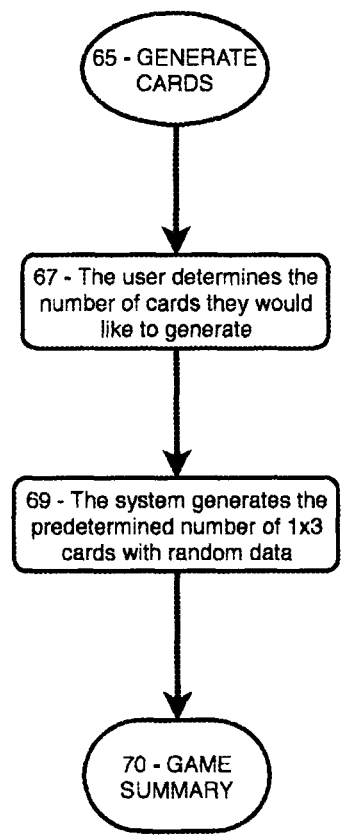
FIG. 9 is a flow chart depicting the assistive generate charts operation 65 of FIG. 8 provided by the App corresponding to interactive input from the player in accordance with the disclosed technology.
Figure 34:
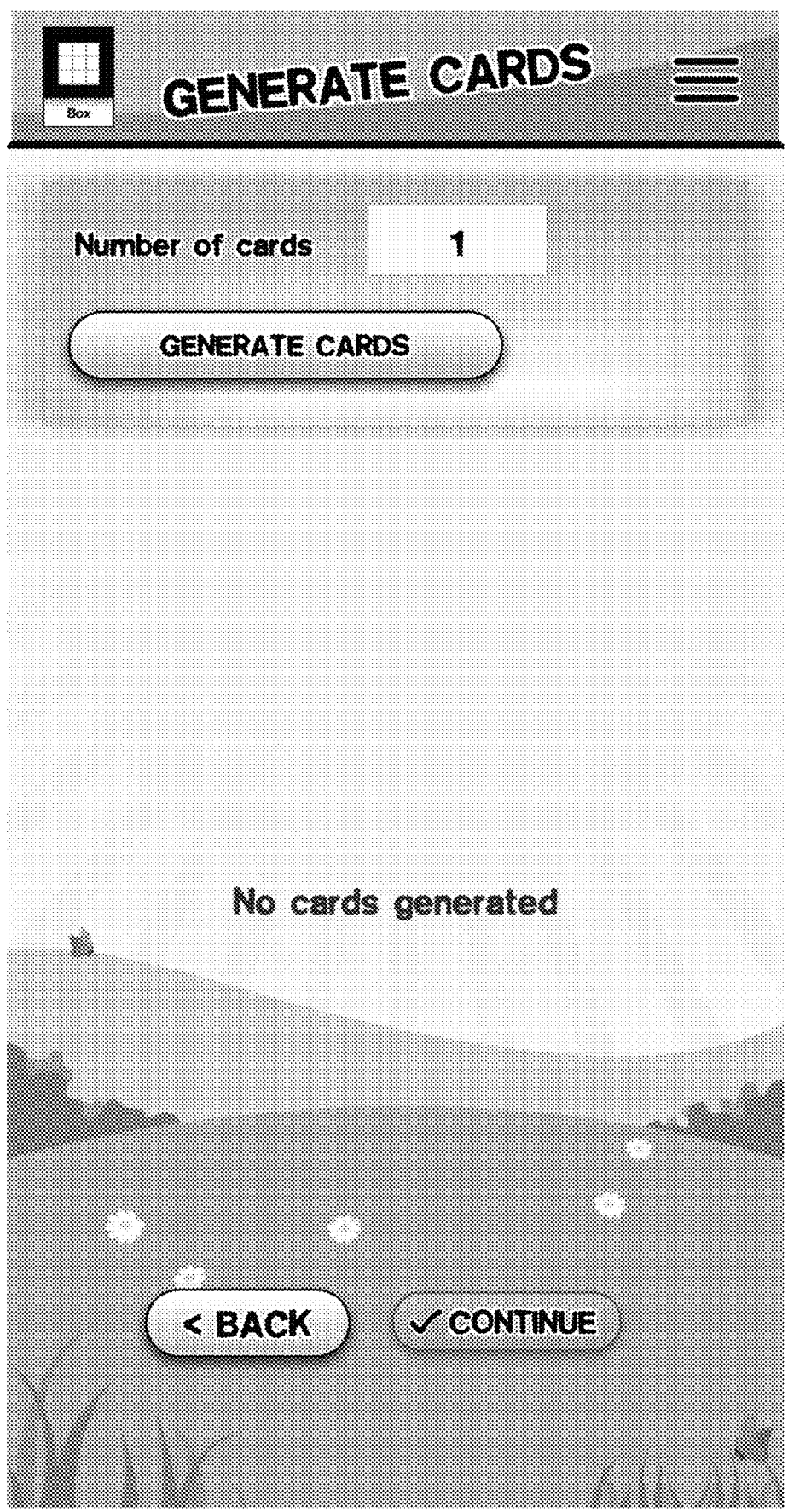
FIG. 34 is an exemplary screen shot of a display generated by the App after a game pattern is selected in private mode presenting to the player input options as to number of array of cards to be generated by the App in private mode.
Figure 35:
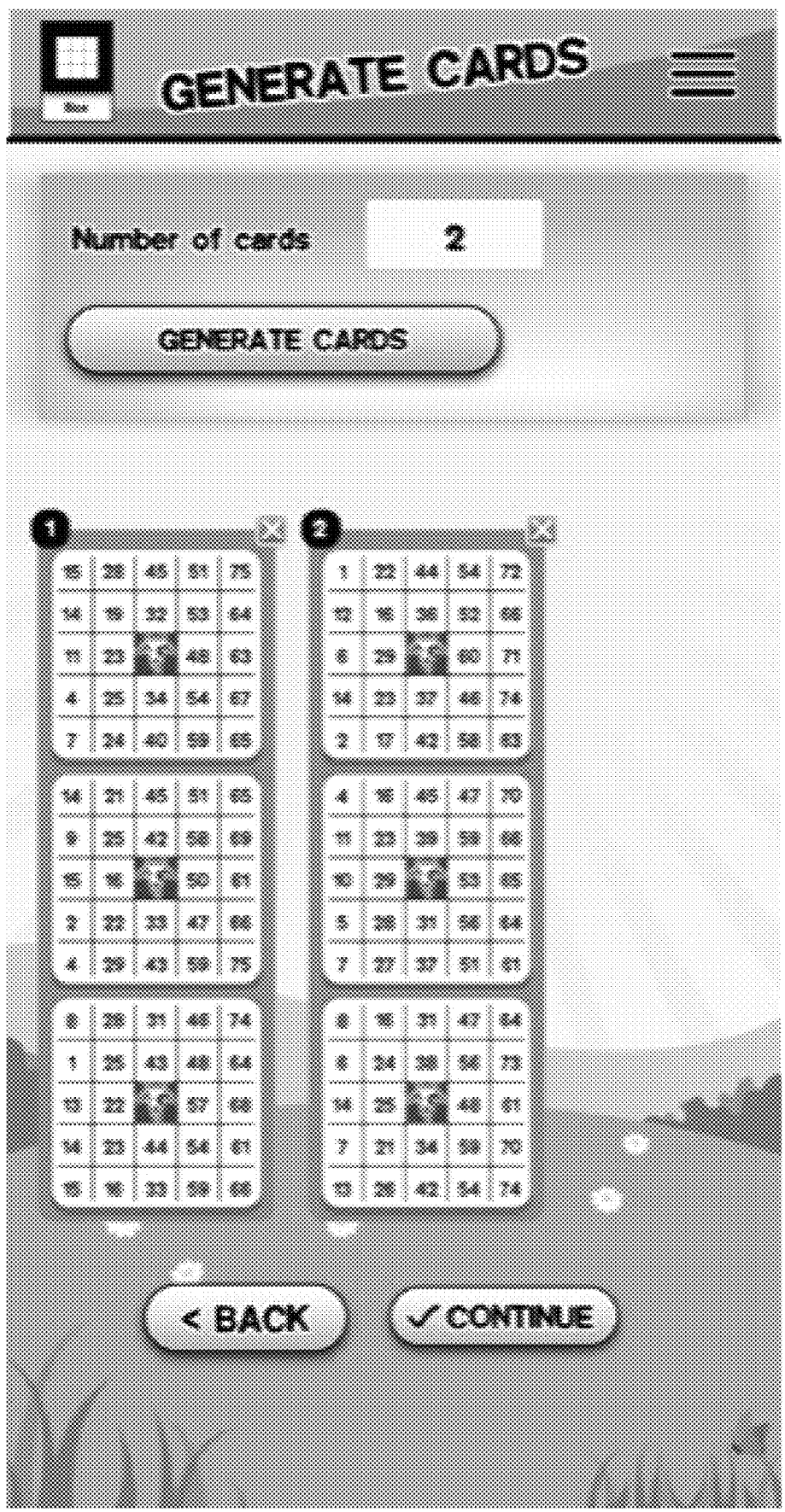
FIG. 35 is an exemplary screen shot of a display generated by the App when the CONTINUE button of FIG. 34 is touched presenting to the player the cards generated by the APP for play.
Figure 36:
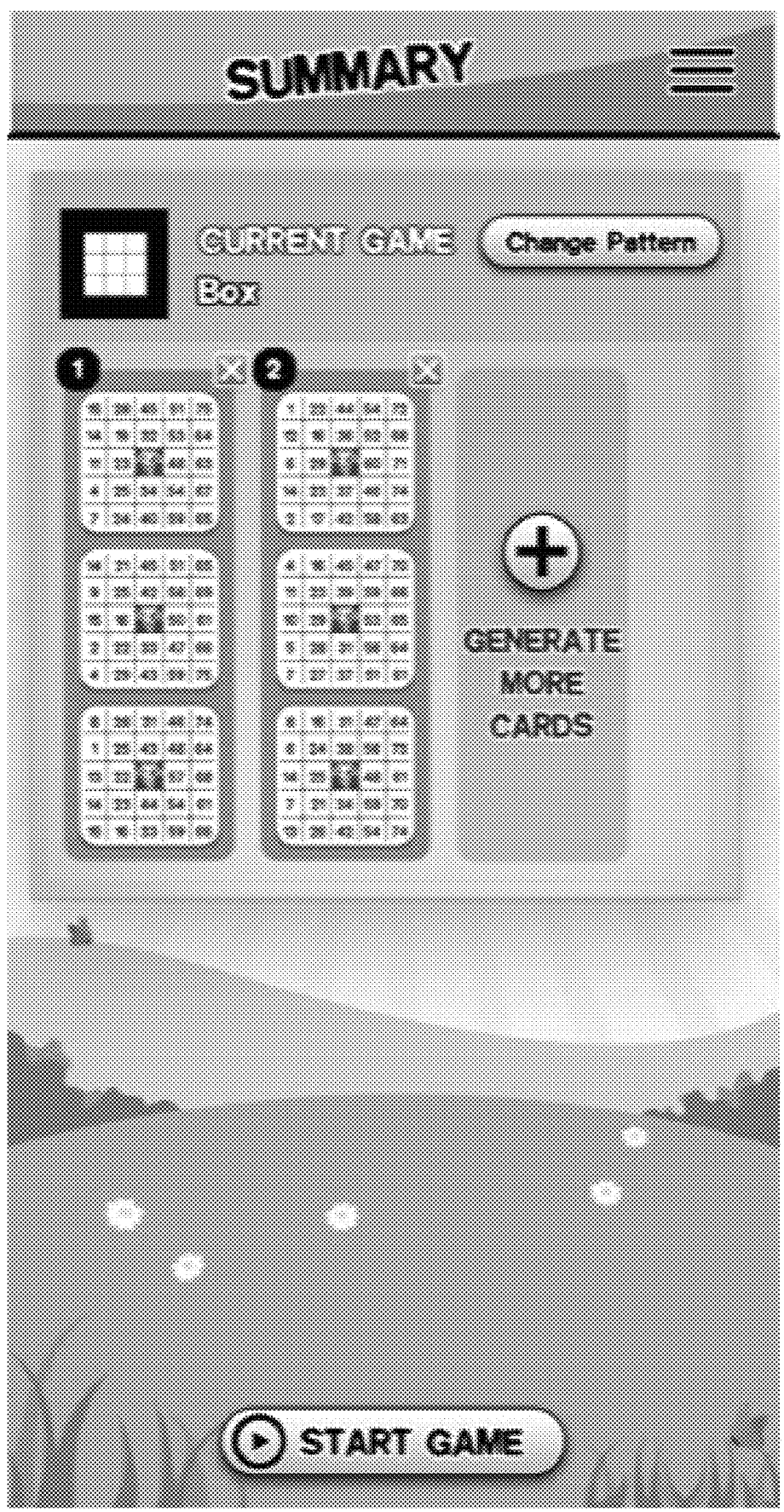
FIG. 36 is an exemplary screen shot of a display generated by the App when the CONTINUE button of FIG. 35 is touched presenting to the player a game summary in private mode.

As depicted in FIG. 9, one means for generating cards 65 may be accomplished by the following steps. The App presents an electronic display prompting player input to select the number of cards to be generated 67, see FIG. 34. The App/system generates the selected number of cards. For example, the App/system generates two sets of 1×3 three card faces inserting random characters into each square of the bingo card faces 69, see FIG. 35. The App then presents a display of the game summary 70 on screen 1390 available for play, see FIG. 36. The player may elect to start the game/begin session play of the game 380, FIG. 36.

Figure 10:
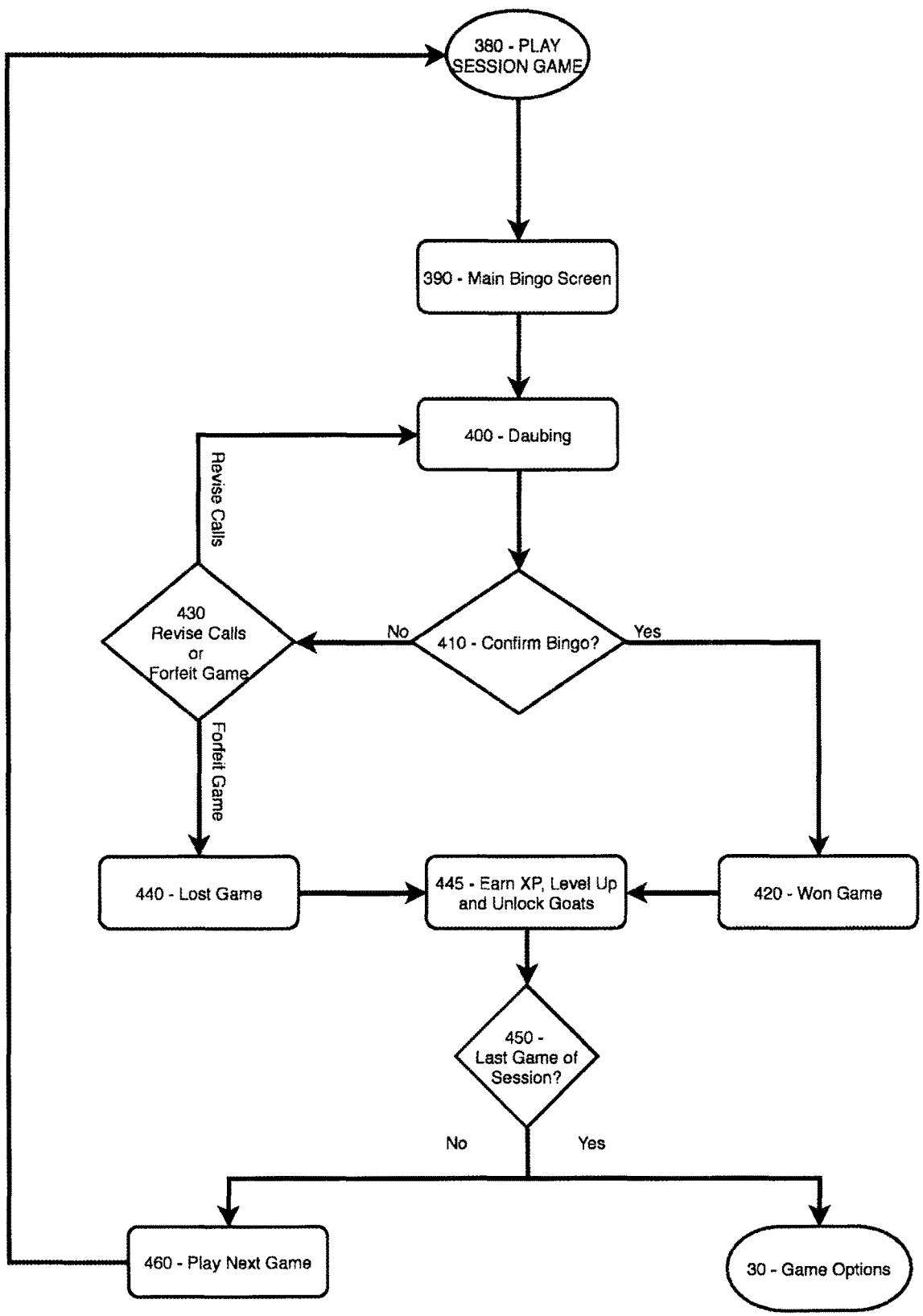
FIG. 10 is a flow chart depicting the assistive steps presented by the App during a bingo game consistent with the alternative embodiment of FIG. 8 and with additional interactive input from the player in accordance with the disclosed technology.
Figure 33:
FIG. 33 is an exemplary screen shot of a display generated by the App after the player selects AUTO-CALLING.
Figure 37:
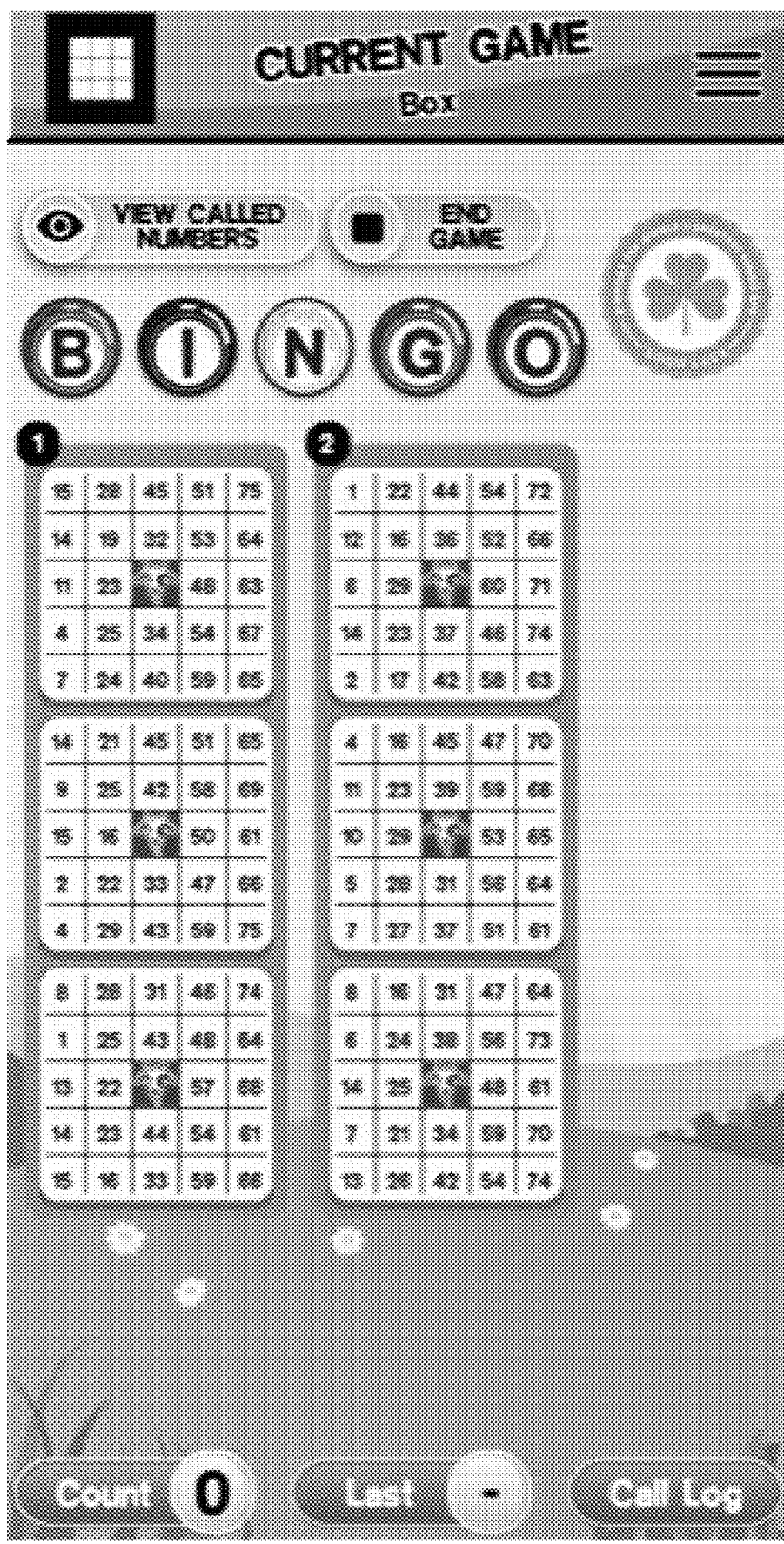
FIG. 37 is an exemplary screen shot of a display generated by the App when the START GAME button of FIG. 36 is touched presenting to the player a current game in private mode.
Figure 38:
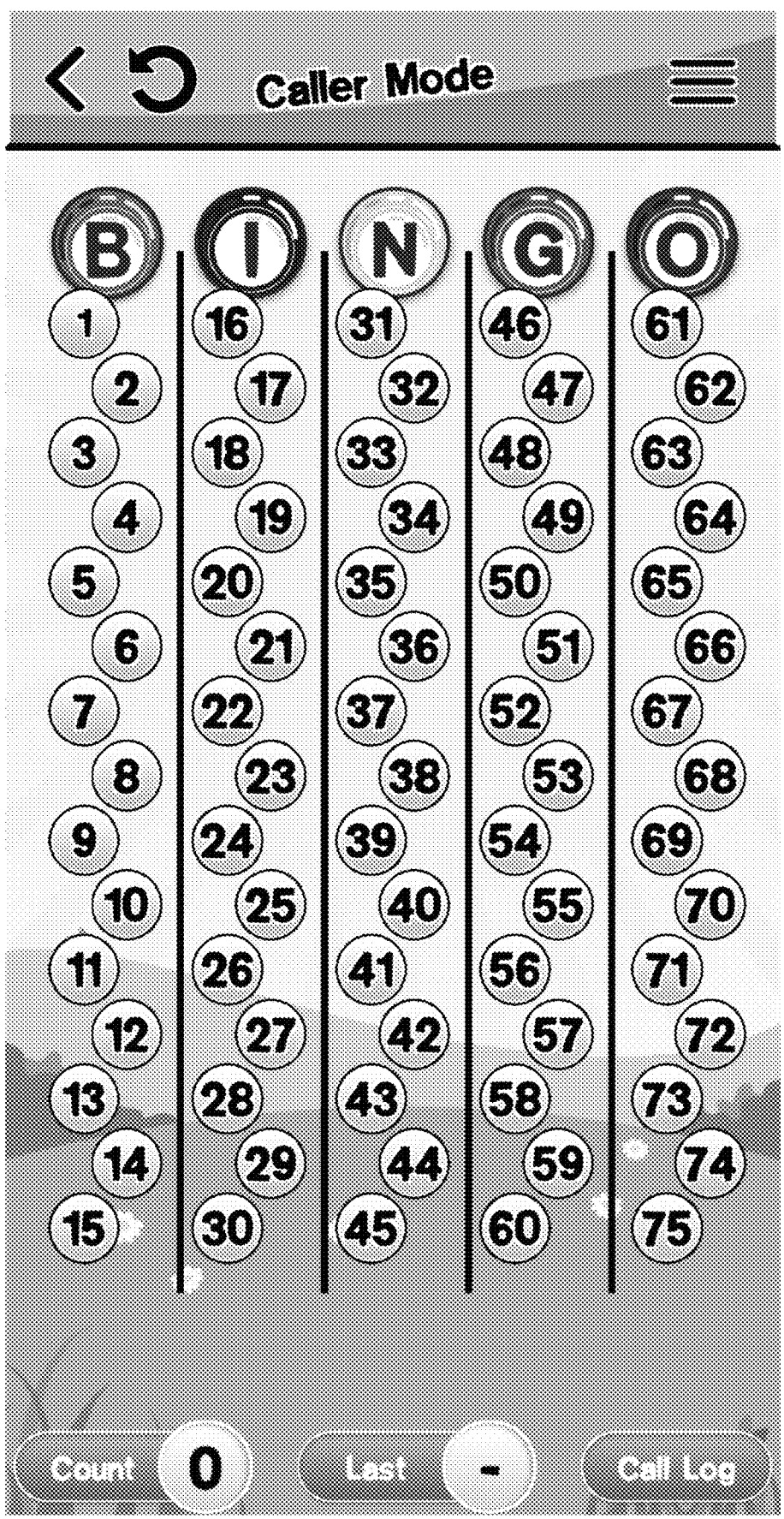
FIG. 38 is an exemplary screen shot of a display generated by the App when the CALLER MODE button of FIG. 16 is touched presenting to the player an overlay of the potential numbers that may be called during the game.
Figure 39:
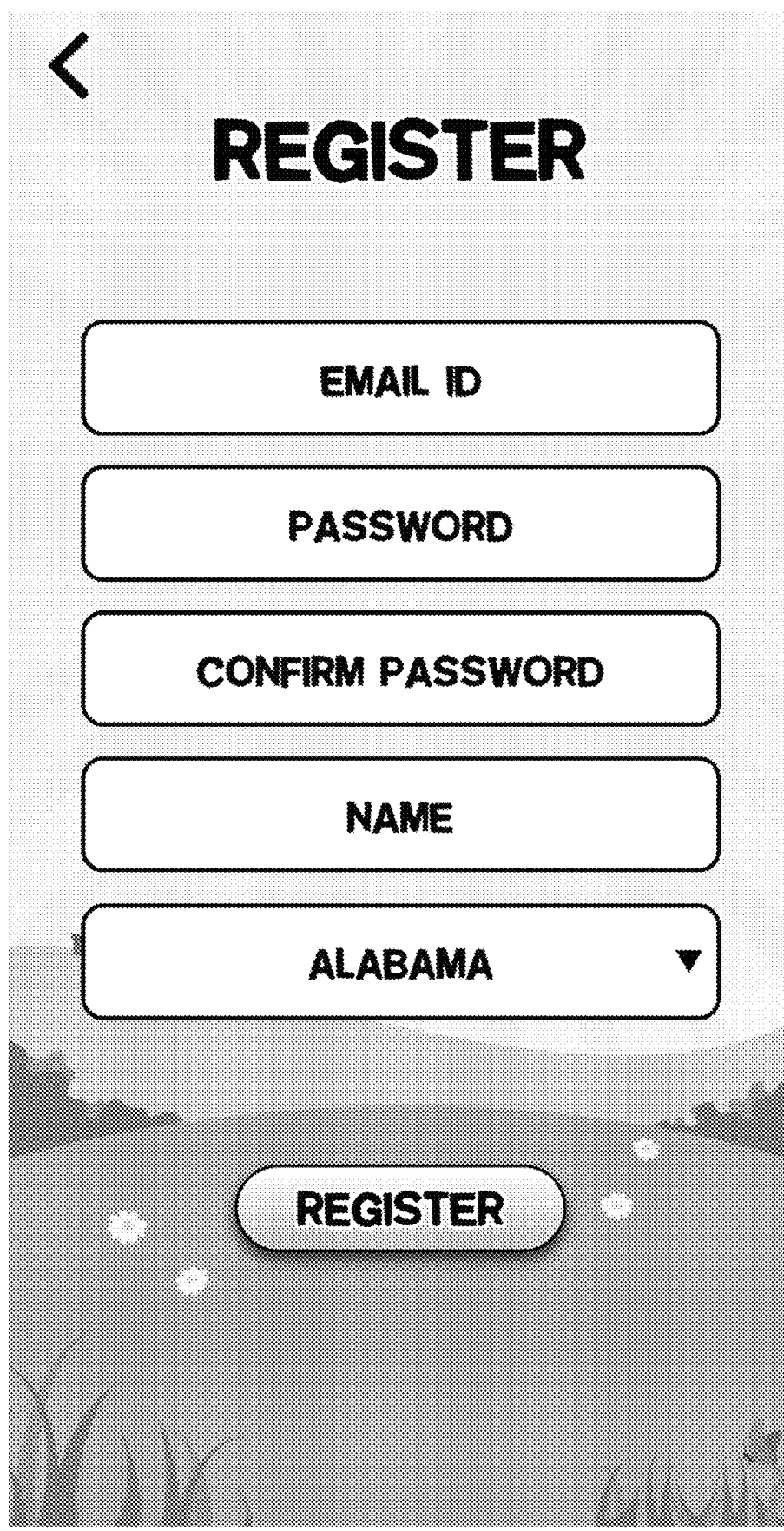
FIG. 39 is an exemplary screen shot of a display generated by the App when the REGISTER button of FIG. 15 is touched presenting registration options to the player.
Figure 40:
FIG. 40 is an exemplary screen shot of a display generated by the App when the CONTINUE AS A GUEST button of FIG. 15 is touched presenting limited game options to the player such as play a single game and caller mode only.

As depicted in FIG. 10, game play 380 set up in FIG. 8, begins with the App displaying main bingo screen 390 on screen 1390. FIG. 37 illustrates an exemplary screen shot of main bingo screen 390 including the bingo card(s) generated 69 by the App. In private play, the player need not be in a physical venue where a game caller is present. A game option of private mode provided by the App includes auto-calling, see FIG. 32. In private mode, by player selection of auto-calling by touching, see FIG. 33, the App simulates the game caller in either a female or male voice.

As characters/numbers are called, the App assists the player to electronically daub 400 the called character on each card(s) in play if the card includes the called character; this is accomplished by player input on device 1300. Daubing step 400 is like daubing 100 discussed above, see FIGS. 5, 22, 23A and 23B. The App references daubs from all game card faces with the required winning combination to determine if bingo has been achieved If bingo has been achieved on at least one card, the App alerts the player to confirm bingo 410 by displaying an alert of bingo on display 1390. If the player achieves bingo then the player wins the game 420.

Figure 27:
FIG. 27 is an exemplary screen shot of a display generated by the App when the SKIP button of FIG. 26 is touched presenting to the player game statistics and awards or after a game as depicted in FIG. 10.

If bingo 410 is not achieved on the last called character, by player input on device 1300 the App presents the player with the options to forfeit the game 430, enter revised calls (in the event the play missed a call or entered a character in error) 430 or enter the next called character. A game is forfeited when, for example, another player achieves bingo and the bingo game is lost by the player 440. After either losing the game 440 or winning the game 420, the player is awarded or earns XP or Experience Points, moves a level up and/or unlocks goats with enhancement features 445 (FIG. 27). After step 445, by player input on device 1300, the player may elect to discontinue play or play another game 450. If the player elects to play the next game 460, the App returns the display to begin session play 380. If the player elects to discontinue play, the App returns the player to the display for game options 30.

Figure 11:
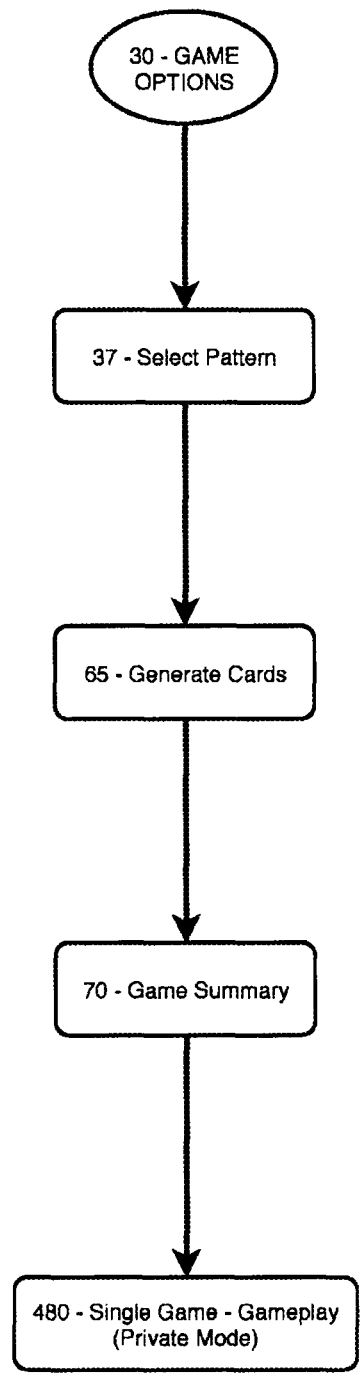
FIG. 11 is a flow chart depicting pre-game steps and selections of an alternative embodiment presented by the App and to be made by interactive paid member/player input for a single game in accordance with the disclosed technology.

In another embodiment as depicted in FIG. 11, the App presents the player with the pre-bingo setup options for single game private mode, that is, the player may play a single game by herself/himself. Like session private play in connection with FIGS. 8-10, In private single play the player need not be in a physical venue where a game caller is present. A game option of private mode provided by the App includes auto-calling, see FIG. 32. In private mode, by player selection of auto-calling by touching, see FIG. 33, the App simulates the game caller in either a female or male voice.

As depicted in FIG. 11, the App may present the player with pre-bingo or pre-game options 30 at an interactive display 1390 such as selecting a pattern 37, generating cards 65, displaying a game summary 70 on screen 1390 available for play and beginning single, private game play 480. Selecting a pattern 37 may be accomplished as discussed above in connection with FIG. 6. As discussed above, one means for generating cards 65 may be accomplished as discussed above in connection with FIG. 9. After generating bingo cards for play 65, the App displays the game summary 70 and the player may select single game-gameplay 480.

Figure 12:
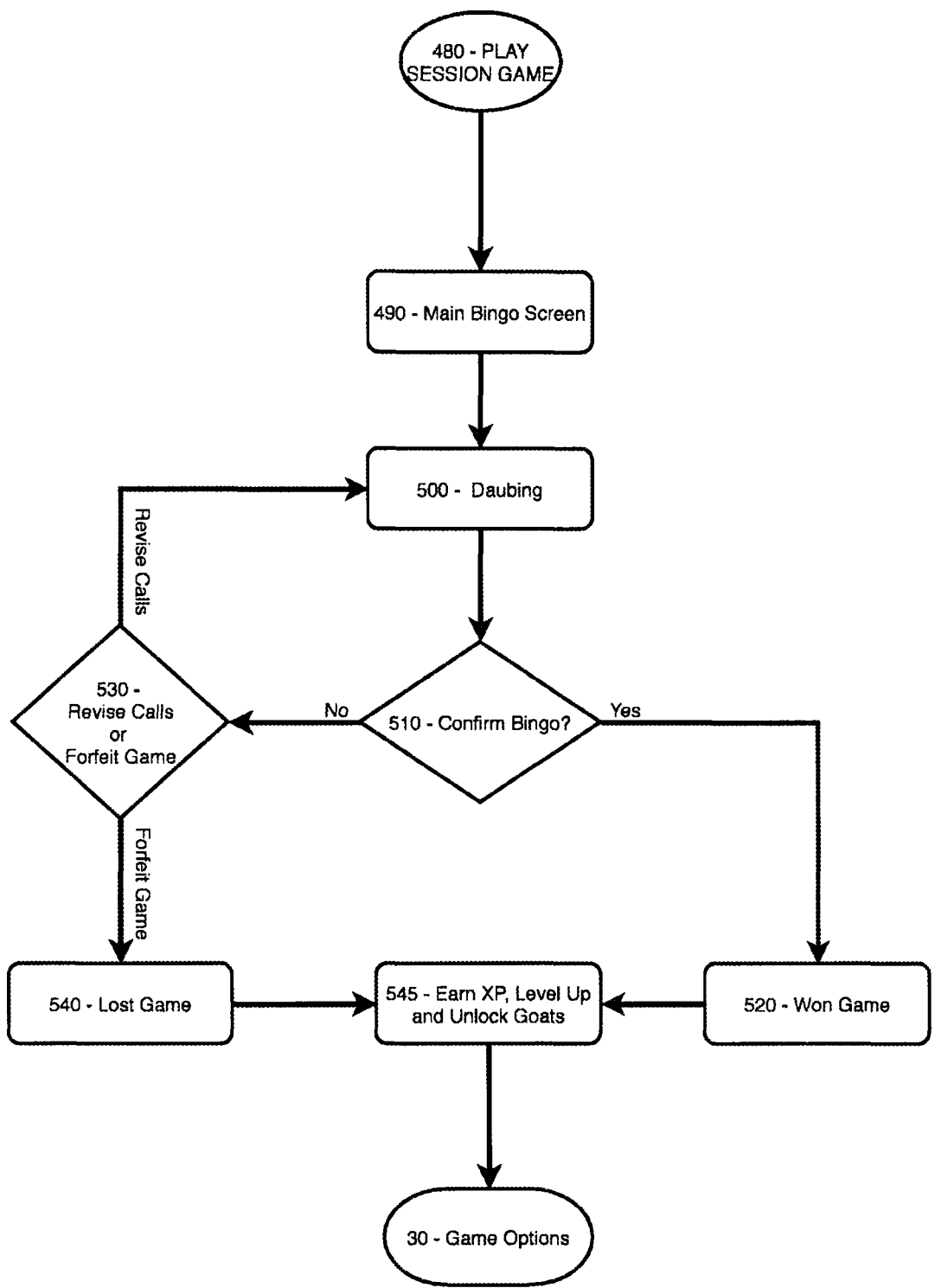
FIG. 12 is a flow chart depicting the assistive steps presented by the App during a bingo game consistent with the alternative embodiment of FIG. 11 and with additional interactive input from the player in accordance with the disclosed technology.

As depicted in FIG. 12, to play the game set up in FIG. 11, the game begins by player input on device 1300 selecting beginning single play of the game 480. The App then displays the main bingo screen 490 on screen 1390, similar to main screen 290, see FIG. 21, depicting the bingo card(s) generated by the App.

As characters/numbers are called, the App assists the player to electronically daub 400 the called character on each card(s) in play if the card includes the called character; this is accomplished by player input on device 1300. Daubing step 400 is like daubing 100 discussed above, see FIGS. 5, 22, 23A and 23B. The App references daubs from all game card faces with the required winning combination to determine if bingo has been achieved If bingo has been achieved on at least one card, the App alerts the player to confirm bingo 510 by displaying an alert of bingo on display 1390. If the player achieves bingo then the player wins the game 520.

If bingo 510 is not achieved on the last called character, by player input on device 1300 the App presents the player with the options to forfeit the game 530, enter revised calls (in the event the play missed a call or entered a character in error) 530 or enter the next called character. A game is forfeited when, for example, another player achieves bingo and the bingo game is lost by the player 540. After either losing the game 540 or winning the game 520, the player is awarded or earns XP or Experience Points, moves a level up and/or unlocks goats with enhancement features 545 (FIG. 27). After step 545, the App returns the player to the display for game options 30.

Figure 23B:
FIG. 23B is an exemplary screen shot of an alternative display generated by the App when the VIEW CALLED NUMBERS button of FIG. 22 is touched presenting to the player an overlay of the potential numbers to be called in the game.
Figure 24:
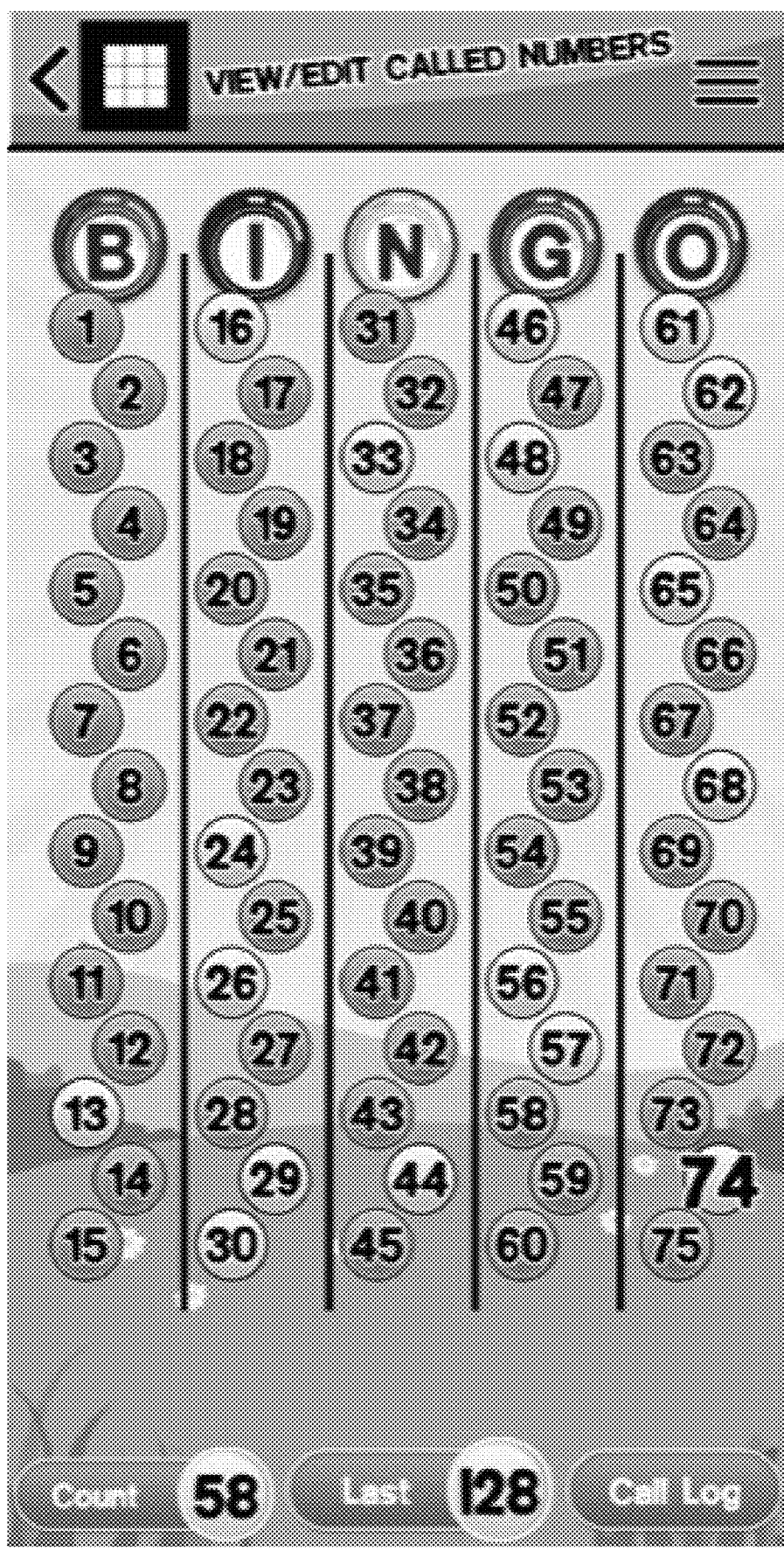
FIG. 24 is an exemplary screen shot of a display generated by the App after the player has repeatedly touched the numbers called during the game and illustrating a pulsed or enlarged number 74 needed to achieve bingo.

Another App feature of daubing 100 that can be incorporated into the various embodiments discussed above and which can be selected by player input on device 1300 is a highlighting or pulsing display of the image of characters still needed to complete bingo on any card in play. For example, if, in caller mode as illustrated by FIG. 23B, O74 only was needed to complete bingo on a card in play, the App in caller mode causes O74 to be dynamically highlighted and/or to pulsed larger on screen 1390, FIG. 24, indicating to the player that if O74 is called bingo will be achieved on a card.

Exemplary Computing Devices and System

An exemplary computing device used to implement the disclosed App may be any type of portable computing device, such as a laptop, a smart device, a mobile telephone, a tablet-style computer, a personal digital assistant or any other handheld electronic device capable of computer processing functions required by the features of the disclosed App. Sufficient computer processing functions can be provided by a combination of hardware and software.

The described systems and methods can be used with or in any suitable operating environment and/or software. In this regard, FIG. 13 and the corresponding discussion are intended to provide an exemplary, general illustration of a suitable operating environment in which embodiments of the App invention may operate. One skilled in the art will appreciate that the exemplary embodiments disclosed herein may be practiced by one or more different or equivalent computing devices and in a variety of computing configurations, platforms and systems. For example, computing environments may include embedded systems with general purpose processing units, digital/media signal processors (DSP/MSP), application specific integrated circuits (ASIC), stand-alone electronic devices, and other such electronic environments.

Embodiments of the App may involve one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

Figure 13:
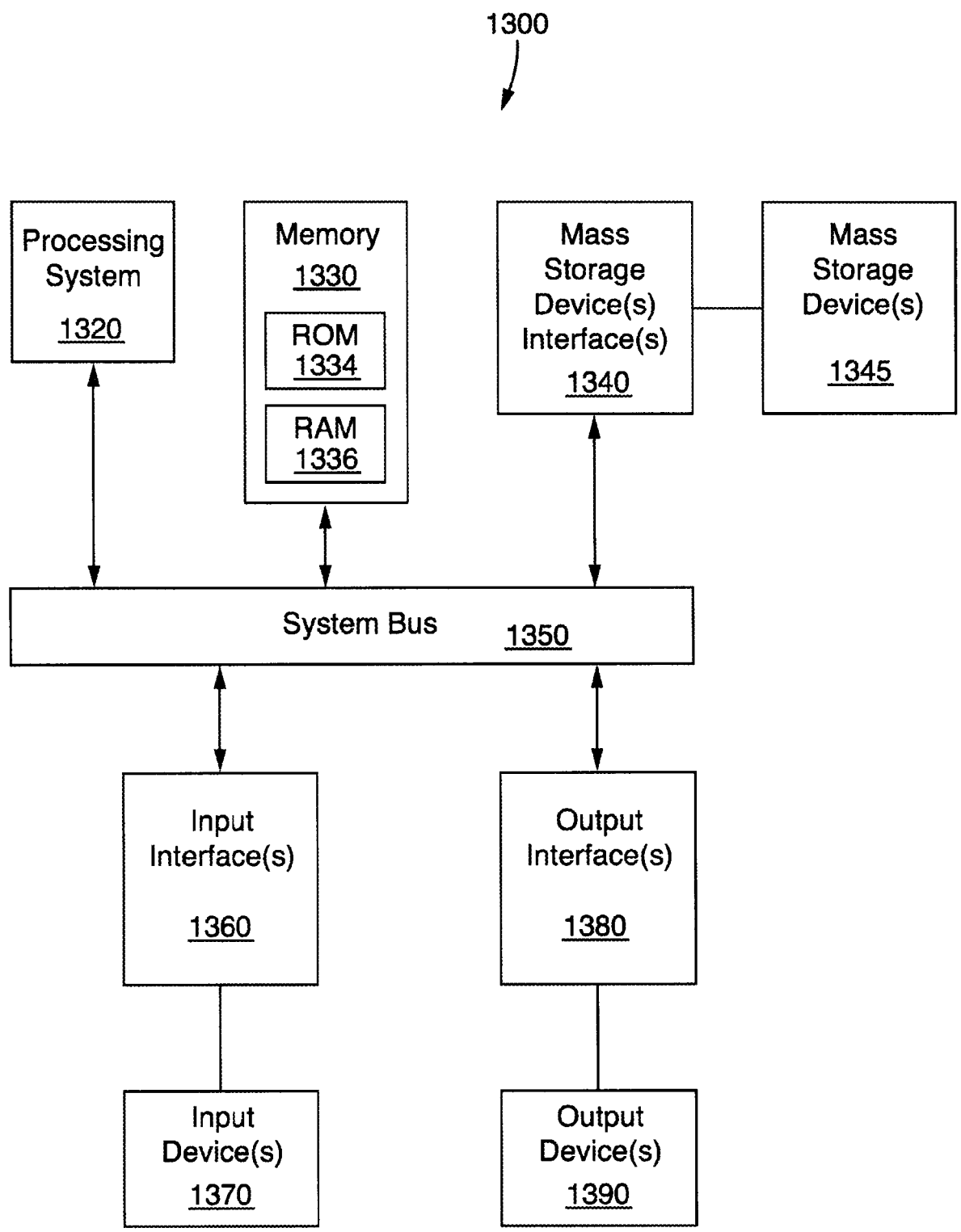
FIG. 13 is an illustrative depiction of a computing device or system which may be used in accordance with the disclosed technology.

As illustrated in FIG. 13, a representative computing system for implementing embodiments of the invention includes computing device 1300, which may be a general-purpose or special-purpose computer or any of a variety of consumer electronic devices. For example, computing device 1300 may be a smart phone, feature phone, handheld device, personal computer, a notebook computer, a netbook, a tablet computer such as the iPad® manufactured by Apple or any of a variety of ANDROID™-based, AMAZON®-based, BLACKBERRY®-based, WINDOWS®-based, and/or similar tablet (and/or other handheld) computers produced by multiple manufacturers, a personal digital assistant ("PDA") or other hand-held device, a workstation, a mini-computer, a mainframe, a supercomputer, a multi-processor system, a network computer, a processor-based consumer electronic device, or the like, running with any suitable operating system (including, without limitation, iOS, Android, Windows, Linux, UNIX, Chromium OS, OS X, BSD, QNX, IBM z/OS, and/or any other suitable known and/or novel operating system).

Computing device 1300 includes system bus 1350, which may be configured to connect various components thereof and to enables data to be exchanged between two or more components. System bus 1350 may include one of a variety of bus structures including a memory bus or memory controller, a peripheral bus, or a local bus that uses any of a variety of bus architectures. Typical components connected by system bus 1350 include processing system 1320 and memory 1330. Other components may include one or more mass storage device interfaces 1340, input interfaces 1360, and/or output interfaces 1380, each of which will be discussed below.

Processing system 1320 may include one or more processors, such as a central processor and optionally one or more other processors designed to perform a particular function or task. It is typically processing system 1320 that executes the instructions provided on computer-readable media, such as on memory 1330, a solid-state drive, a flash drive, a magnetic hard disk, a removable magnetic disk, a magnetic cassette, an optical disk, or from a communication connection, which may also be viewed as a computer-readable medium.

Memory 1330 includes one or more computer-readable media that may be configured to include or includes thereon data or instructions for running the App, manipulating data, and may be accessed by processing system 1320 through system bus 1350. Memory 1330 may include, for example, ROM 1334, used to permanently store information, and/or RAM 1336, used to temporarily store information. ROM 1334 may include a basic input/output system ("BIOS") having one or more routines that are used to establish communication, such as during start-up of computing device 1300. RAM 1336 may include one or more program modules, such as one or more operating systems, application programs, and/or program data.

One or more mass storage device interfaces 1340 may be used to connect one or more mass storage devices 1344 to system bus 1350. The mass storage devices 3144 may be incorporated into or may be peripheral to computing device 1300 and allow computing device 1300 to retain large amounts of data. Optionally, one or more of the mass storage devices 1344 may be removable from computing device 1300. Examples of mass storage devices include solid-state drives, flash drives, hard disk drives, magnetic disk drives, tape drives and optical disk drives. A mass storage device 1344 may read from and/or write to a magnetic hard disk, a removable magnetic disk, a magnetic cassette, an optical disk, or another computer-readable medium. Mass storage devices 1344 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 1360 may be employed to enable a user to enter data and/or instructions to computing device 1300 through one or more corresponding input devices 1370. Examples of such input devices 1370 include a keyboard and alternate input devices, such as a mouse, trackball, touch screen, light pen, stylus, or other pointing device, a microphone, a joystick, a game pad, a satellite dish, a scanner, a camcorder, a digital camera, an interactive touch screen, and the like. Similarly, examples of input interfaces 1370 that may be used to connect the input devices 1370 to the system bus 1350 may include a serial port, a parallel port, a game port, a universal serial bus ("USB"), an integrated circuit, a FIREWIRE® (IEEE 1394), lightning port, HDMI, or another interface. For example, in some embodiments input interface 1360 includes an application specific integrated circuit (ASIC) that is designed for a particular application. In a further embodiment, the ASIC is embedded and connects existing circuit building blocks.

One or more output interfaces 1380 may be employed to connect one or more corresponding output devices 1390 to system bus 11350. Examples of output interfaces 1380 include a video adapter, an audio adapter, a parallel port, and the like. Examples of output devices 1390 may include a monitor or display screen or other electronic display, a speaker, a printer, a multi-functional peripheral, a device capable of receiving an email message, text or other communication, and the like. A particular output device 1390 may be integrated with or peripheral to computing device 1300. Examples of electronic displays include monitors, televisions, e-ink displays, projection displays, or any other display capable of displaying changing information under the control of computing device 1300.

Other Embodiments

Other embodiments of the App provide bingo related functions which with allow the player to search stored data to find location-specific game types as desired by the player. For example, the App may allow the player to retrieve stored data corresponding to tagged venue locations to allow the player to select a particular venue having the game pattern desired by the player.

Other embodiments of the App provide functionality which allows players to send support email messages to a system or App administrator.

Some embodiments of the App provide functionality which allows players to require membership registration, including username, password and other known sign-in protocols, and login before all the functions of the App can be used.

Other embodiments of the App provide functionality which allows players to set notification preferences about the App related to email, push notifications, location preferences, updates and the like.

Other embodiments of the App provide functionality which allows players to create custom bingo card features with different size arrays, titles, or patterns or other criteria to achieve bingo such as by player input by touching an interactive screen 1390 on device 1300 to identify and select the desired custom features.

Other embodiments of the App provide functionality which allows players to share the App through the available options from the device's operating system.

Other embodiments of the App provide functionality which allows players to customize and modify the order of bingo games being played simultaneously so that the play can adhere to the rules of the different game patterns as the games are played. After setting the order of game patterns by player input, the user will be able to play multiple games in a row. After finishing a game, the player or the App resets the game, captures new bingo cards or calls up the next cards in order, and the App automatically jumps to the next game pattern in the ordered sequence without requiring the player to set-up a new game pattern in the App between games.

Other embodiments of the App provide functionality which permits the App to integrate with custom advertising or other advertising such as Google AdMob ads or other custom banners.

Other embodiments of the App provide functionality which allows players to change a stored character state from called to uncalled or remove virtual marks or daubs, in the case of a mistaken mark. For example, this may be accomplished by the player touching the daubed character on the interactive display, whereupon the App prompts the player to daub or un-daub the touched character.

Other embodiments of the App provide functionality which allows players to select an option to receive information from a bingo caller's transmitter.

Other embodiments of the App provide functionality to optically detect the ink color on the physical bingo card being captured for display and using a different color to be used for virtual marks/daubs, or to allow the player to select the color for marks/daubing.

Other embodiments of the App provide functionality to optically read a bingo number display board at the game venue.

Other embodiment of the App may provide functionality to use a portable scanner on computing device to scan a barcode located on a bingo card to recognize or identify the bingo card and store the card content on the computing device.

Other embodiment of the App may provide functionality to read information contained in a Near Field Communication (NFC) tag located on or embedded within a bingo card to recognize or identify the bingo card and store the card content on the computing device.

Other embodiment of the App may provide functionality to read information contained in a radio frequency identification (RFID) tag located on or embedded within a bingo card to recognize or identify the bingo card and store the card content on the computing device.

Any of the steps, operations, or processes described herein may be performed or implemented with one or more hardware or software modules or products, alone or in combination with other devices. In one embodiment, a computer program product capable of providing the functionality described above is implanted comprising a computer-readable medium containing computer program code, which can be executed by a computer processor for performing any or all of the steps, operations, or processes described.

Embodiments of the invention may also relate to an apparatus or system for performing the operations herein. This apparatus may be specially constructed for the required purposes, and/or it may comprise a general-purpose computing device selectively activated or reconfigured by a computer program stored in the computer having the functionality disclosed herein.

The previous explanation of one or more embodiments of the invention in detail is to be understood that the invention is not limited in its application to the details of construction and to the arrangements of the components set forth in the forgoing description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the concepts, upon which this disclosure is based, may readily be utilized as a basis for the designing of other structures, methods and systems for carrying out the several purposes of the present invention.

The forgoing detailed descriptions are merely exemplary in nature and are not intended to limit the described embodiments of the application, uses of the described embodiments or scope of the appended claims. As used herein, the word "exemplary" or "illustrative" means serving as an example, instance, or illustration. Any implementation described herein as "exemplary" or "illustrative" is not necessarily to be construed as preferred or advantageous over other implementations. All of the implementations described above are exemplary implementations provided to enable persons skilled in the art to practice the disclosed invention at a future date.

The scope of the invention is, therefore, indicated by the appended claims rather than by the foregoing description.

All changes that come within the meaning and range of equivalency of the claims are to be embraced within their scope. That is, the disclosed subject matter is to be regarded as including equivalents insofar as they do not depart from the spirit and scope of the present invention while providing equivalent functionality.

What is claimed is:

1. A computing device for playing a live bingo game comprising:
   a central processor;
   memory;
   an interactive output display;
   camera functionality configured to capture a likeness of the face of one or more physical bingo cards and store the likeness and character content of each bingo card in memory on the computing device, each face of each bingo card comprising characters to be called during the bingo game; and
   a computer application stored in memory on the computing device, the computer application comprising executable code to convert the stored likeness of each bingo card into an interactive display of the bingo card on the output display of the computing device, the computer application and interactive display facilitating player input of characters called during the bingo game, and the computer application automatically identifying instances of matches between the called characters and characters on the face of each bingo card.

2. The device of claim 1 wherein facilitating player input of characters called during the bingo game comprises daubing the called character by player input on the interactive display.

3. The device of claim 2 wherein daubing comprises the application presenting the player with an interactive display on the output device of each set of numbers associated with the letter B, I, N, G and O when the player touches one of the letters on the interactive display.

4. The device of claim 2 wherein daubing comprises the application presenting the player with an interactive display on the output device of all the possible characters to be called during the game when the player touches a view called numbers option.

5. The device of claim 1 wherein the computer application further comprises functionality to present player-selectable bingo game pattern options on the output display.

6. The device of claim 1 wherein the computer application further comprises functionality to present player-selectable single or session game modes on the output display.

7. The device of claim 1 wherein the computer application further comprises functionality to generate interactive displays of bingo cards without requiring the capture of the likeness or content of the physical bingo cards.

8. The device of claim 1 wherein automatically identifying instances of matches between the called characters and characters on the face of each bingo card comprises the application referencing each called character to the characters on each face of the bingo cards to determine whether a called character is the same as a character on the face of a bingo cards.

9. A computer-implemented method for streamlining the process of playing bingo, the method comprising:
   loading and initiating an application into memory on a computing device comprising
      a central processor,
      memory, an interactive output display, and
      camera functionality,
   the application comprising executable code to convert a likeness of each bingo card into an interactive display of the bingo card on the output display of the computing device;
   capturing a likeness and character content on the face of one or more physical bingo cards using the camera functionality and storing the captured likeness and character content of each bingo card in memory on the computing device, each face of each bingo card comprising characters to be called during the bingo game; and
   executing the executable code of the application by the computing device to convert the stored likeness and content of each bingo card into an interactive display of the bingo card on the output display of the computing device, the computer application and interactive display facilitating player input of characters called during the bingo game; and
   automatically identifying instances of matches by the application between the called characters and characters on the face of each bingo card.

10. The method of claim 9 wherein converting the stored likeness and content of each bingo card into an interactive display of the bingo card on the output display of the computing device comprising using optical or image character recognition technology to interpret and store the likeness and content of each bingo card.

11. The method of claim 9 further comprising adding and/or editing different game patterns that will require different configurations to achieve bingo.

12. The method of claim 9 wherein the computer application comprises content management functionality or a set of related executable code to create and manage the digital contents of each bingo card.

13. The method of claim 9 wherein the computer application and interactive display facilitating player input of characters called during the bingo game comprises daubing via the interactive display.

14. The method of claim 13 wherein the daubing comprises the application presenting the player with an interactive display on the output device of each set of numbers associated with the letter B, I, N, G and O when the player touches one of the letters on the interactive display.

15. The device of claim 13 wherein daubing comprises the application presenting the player with an interactive display on the output device of all the possible characters to be called during the game when the player touches a view called numbers option.

16. A computer application product stored in memory on the computing device with camera functionality, the computer application product comprising:
   executable code capable of
      directing the use of the camera functionality of the computing device to capture the likeness and content of each physical bingo card in play,
      converting the likeness of each bingo card into an interactive display of the bingo card on an output display of the computing device,
      generating an interactive display on the output display to prompt player input of characters called during the bingo game, and
      automatically identifying instances of matches between the called characters and characters on the face of each bingo card.

17. The application product of claim 16 wherein to prompt player input of characters called during the bingo game comprises daubing the called character by player input on the interactive display.

18. The application product of claim 17 wherein daubing comprises the application presenting the player with an interactive display on the output device of each set of numbers associated with the letter B, I, N, G and O when the player touches one of the letters on the interactive display.

19. The application product of claim 17 wherein daubing comprises the application presenting the player with an interactive display on the output device of all the possible characters to be called during the game when the player touches a view called numbers option.

20. The application product of claim 16 further comprising functionality to present player-selectable bingo game pattern options on the output display.

21. The application product of claim 16 wherein further comprising functionality to generate interactive displays of bingo cards without requiring the capture of the likeness or content of the physical bingo cards.

22. The application product of claim 16 wherein automatically identifying instances of matches between the called characters and characters on the face of each bingo card comprises the application referencing each called character to the characters on each face of the bingo cards to determine whether a called character is the same as a character on the face of a bingo cards.

23. The application product of claim 16 further comprising functionality to present player-selectable bingo game pattern options on the output display.

\* \* \* \* \*